(12) United States Patent
Van Der Vleuten et al.

(10) Patent No.: US 10,194,162 B2
(45) Date of Patent: Jan. 29, 2019

(54) METHODS AND APPARATUSES FOR CREATING CODE MAPPING FUNCTIONS FOR ENCODING AN HDR IMAGE, AND METHODS AND APPARATUSES FOR USE OF SUCH ENCODED IMAGES

(71) Applicant: KONINKLIJKE PHILIPS N.V., Eindhoven (NL)

(72) Inventors: Renatus Josephus Van Der Vleuten, Veldhoven (NL); Jeroen Hubert Christoffel Stessen, Eindhoven (NL); Johannes Gerardus Rijk Van Mourik, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 198 days.

(21) Appl. No.: 14/903,630

(22) PCT Filed: Jun. 30, 2014

(86) PCT No.: PCT/EP2014/063815
§ 371 (c)(1),
(2) Date: Jan. 8, 2016

(87) PCT Pub. No.: WO2015/007505
PCT Pub. Date: Jan. 22, 2015

(65) Prior Publication Data
US 2016/0165256 A1     Jun. 9, 2016

Related U.S. Application Data

(60) Provisional application No. 61/847,608, filed on Jul. 18, 2013, provisional application No. 61/986,255, (Continued)

(30) Foreign Application Priority Data

Sep. 24, 2013   (EP) ..................................... 13185742
Feb. 21, 2014   (EP) ..................................... 14156184

(51) Int. Cl.
*H04N 19/46*     (2014.01)
*H04N 1/64*      (2006.01)
(Continued)

(52) U.S. Cl.
CPC ........... *H04N 19/46* (2014.11); *G06F 3/1423* (2013.01); *G09G 5/10* (2013.01); *H04N 1/64* (2013.01);
(Continued)

(58) Field of Classification Search
CPC .......... H04N 19/46; H04N 19/36; H04N 1/64; G06F 3/1423; G09G 5/10; G09G 2320/0271
See application file for complete search history.

(56) References Cited

U.S. PATENT DOCUMENTS

| | | |
|---|---|---|
| 6,335,983 B1 | 2/2002 | McCarthy et al. |
| 2005/0152597 A1 | 7/2005 | Spaulding et al. |

(Continued)

FOREIGN PATENT DOCUMENTS

| | | |
|---|---|---|
| GB | 2463375 A | 3/2010 |
| WO | 20051040035 A1 | 11/2005 |

(Continued)

OTHER PUBLICATIONS

Hunt, "Objective in Colour Reproduction", the Reproduction of Colour, Sixth Edition, Wiley, 2006, p. 172-173, 352-355, 438-441.
(Continued)

*Primary Examiner* — Dave Czekaj
*Assistant Examiner* — Berteau Joisil

(57) ABSTRACT

To enable better encoding of the currently starting to appear high dynamic range images for use in full high dynamic range technical systems (containing an HDR display, and e.g. in an HDR grading application of a HDR movie), we invented a method of encoding a high dynamic range image, (Continued)

comprising the steps of: —inputting pixel colors of an input high dynamic range image, wherein the pixel colors have information of a luminance and a chromaticity; —applying an inverse of a mapping function to derive a luma code (v) of the luminance of a pixel color, which mapping function is predetermined as comprising a first partial function which is defined as (I), in which rho is a tuning constant, and v is the luma code corresponding to a luminance to be encoded, and a second partial mapping defined as $L=L_m P^\gamma$ in which Lm is a peak luminance of a predefined reference display, and gamma is a constant which is preferably equal to 2.4, —outputting a matrix of pixels having a color encoding comprising the luma codes.

18 Claims, 11 Drawing Sheets

Related U.S. Application Data filed on Apr. 30, 2014, provisional application No. 61/990,138, filed on May 8, 2014.

(51) Int. Cl.
   *H04N 9/68* (2006.01)
   *H04N 19/36* (2014.01)
   *H04N 5/235* (2006.01)
   *G06F 3/14* (2006.01)
   *G09G 5/10* (2006.01)

(52) U.S. Cl.
   CPC ............. *H04N 5/2355* (2013.01); *H04N 9/68* (2013.01); *H04N 19/36* (2014.11); *G09G 2320/0271* (2013.01)

(56) References Cited

U.S. PATENT DOCUMENTS

| | | | |
|---|---|---|---|
| 2010/0172411 A1* | 7/2010 | Efremov | H04N 19/136 375/240.12 |
| 2010/0226547 A1 | 9/2010 | Criminisi et al. | |
| 2014/0044372 A1* | 2/2014 | Mertens | H04N 19/46 382/248 |
| 2015/0201222 A1* | 7/2015 | Mertens | H04N 19/46 382/233 |

FOREIGN PATENT DOCUMENTS

| | | |
|---|---|---|
| WO | 2010104624 A2 | 9/2010 |
| WO | 2014056679 A1 | 4/2014 |
| WO | 2015007510 A1 | 1/2015 |

OTHER PUBLICATIONS

Banterle et al, "A Framework for Inverse Tone Mapping", the Visual Computer, vol. 23, No. 7, May 24, 2007, p. 467-478.

Motra et al, "An Adaptive LogLuv Transform for High Dynamic Range Video Compression", Proceedings of the 17th International Conference on Image Processing, 2010, p. 2061-2064.

"Tone Mapping," Wikipedia, the Free Encyclopedia, [Online]. Available: http://en.wikipedia.org/wiki/tone_mapping, Accessed Jan. 8, 2016, pp. 1-8.

"Cinematographer," Wikipedia, the Free Encyclopedia, [Online]. Available: http://en.wikipedia.org/wiki/director_of_photography, accessed Jan. 8, 2016, pp. 1-3.

"Film Speed," Wikipedia, the Free Encyclopedia, [Online]. Available: http://en.wikipedia.org/wiki/exposure_index#ei, Accessed Jan. 8, 2015, pp. 1-27.

Kikuchi et al, "Compression of High Dynamic Range Images in the Yu'v' Color Space", ITC-CSCC 2013, pp. 631-634.

Larson, "The LogLuv Encoding for Full Gamut, High Dynamic Range Images", Journal of Graphics Toos, 1998, pp. 1-7.

Mandel, B. et al., "High Dynamic Range Video Coding Results", 15th Meeting, Geneva, 2013.

Lasserre, S. et al., "High Dynamic Range Video Coding", 16th Meeting, San Jose, 2014.

* cited by examiner

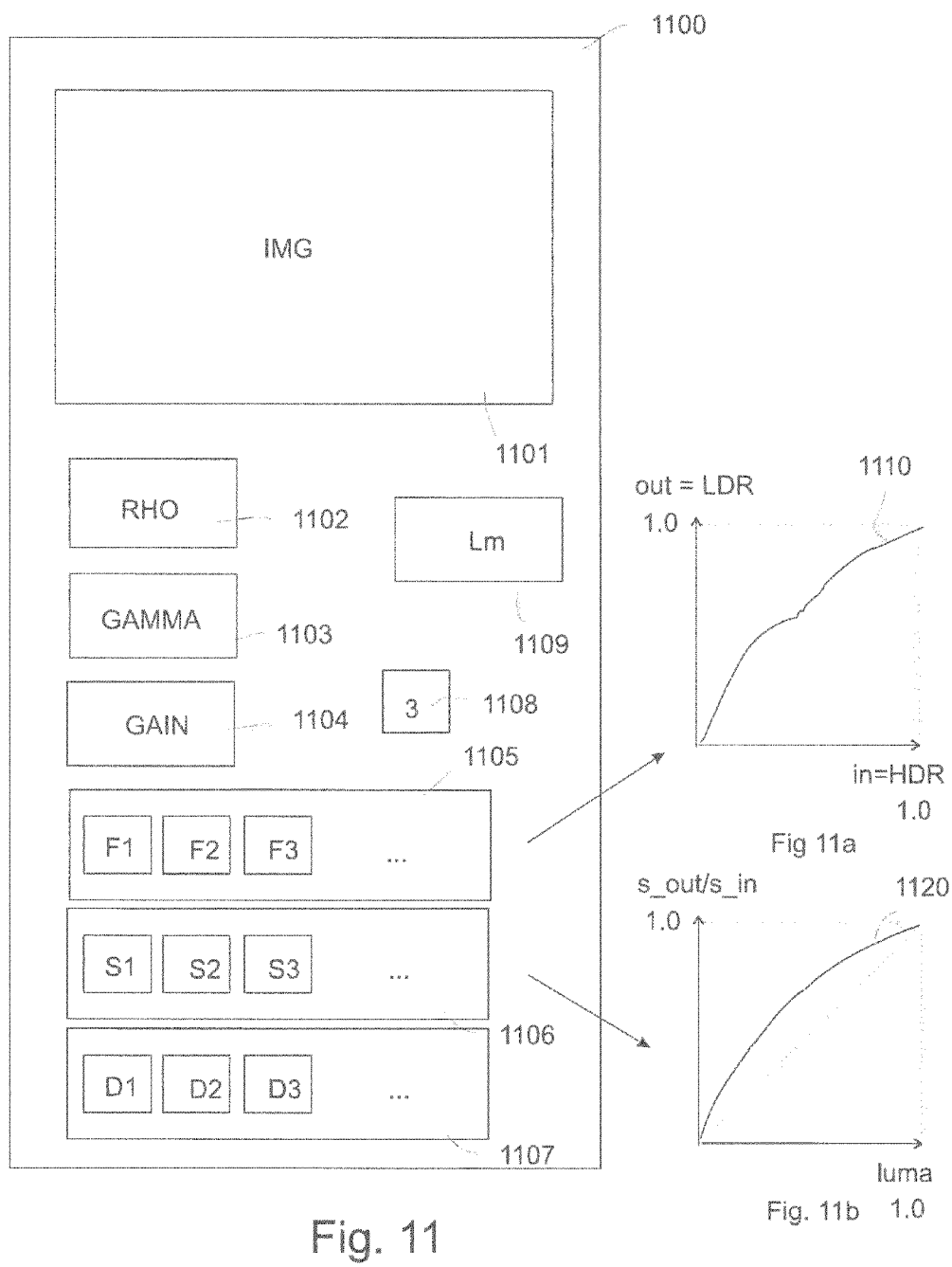

METHODS AND APPARATUSES FOR CREATING CODE MAPPING FUNCTIONS FOR ENCODING AN HDR IMAGE, AND METHODS AND APPARATUSES FOR USE OF SUCH ENCODED IMAGES

CROSS-REFERENCE TO PRIOR APPLICATIONS

This application is the U.S. National Phase application under 35 U.S.C. § 371 of International Application No. PCT/EP2014/063815, filed on Jun. 30, 2014, which claims the benefit of U.S. Provisional Applications 61/847,608, filed Jul. 18, 2013; 61/986,255, filed Apr. 30, 2014; 61/990,138, filed May 8, 2014 and European Patent Applications 13185742.7, filed Sep. 24, 2013; 14156184.5, filed Feb. 21, 2014. These applications are hereby incorporated by reference herein.

FIELD OF THE INVENTION

The invention relates to encoding of one (i.e. a still) but preferably more (i.e. video) High Dynamic Range image(s), either natively meaning we only need an encoding for a HDR brightness look image (typically an image optimal for display on displays with high peak brightness like e.g. 5000 nit, and with significant objects across many brightnesses, i.e. up to deep black), or in a dual encoding: wherein in addition to the HDR image look we encode a corresponding LDR image look. Furthermore the encoding is preferably so that it can fit into the current image or video encoding frameworks of existing technology, like e.g. blu-ray disk storage, or HDMI cable connections, or other image transmission or storage systems. HDR video (or even still image) encoding has been a daunting task up to now, and the typical belief is that one either needs to go towards significantly more bits, for encoding the brightnesses above the LDR range of scene objects (e.g. encodings which encode scene luminances directly), or one needs some two-layer approach, wherein e.g. in addition to an object reflectance image there is a illumination boost image, or similar decomposition strategies. Philips has recently proposed a much simpler single image approach, which is a totally new direction, and not only a priori difficult to imagine, but also when actually doing it leading to many technical issues to be solved, however which in practice works, and in which specific framework the present patent application text teaches some parts of building such a coding technology, and the whole framework around it like artistic grading for different reproduction scenarios (at least a realistically/optimally looking image for an HDR display, and an LDR display).

With "high dynamic range" (HDR) we mean that either the image(s) as captured from the capturing side have a high luminance contrast ratio compared to legacy LDR encoding (i.e. contrast ratios of 10.000:1 or more may be achievable by the coding, and all components of the image handling chain up to rendering; and captured object luminances may be above 1000 nit, or more specifically, may typically be reproduced above 1000 nit to given the reproduction environment generate some desired appearance of say a lit lamp or sunny exterior), and/or the rendering of such image(s) is HDR (i.e. the images must be suitable in that they contain information sufficient for high quality HDR rendering, and preferably in a technically easy to use manner), meaning the image(s) are rendered or intended to be rendered on displays with peak brightness of at least 2000 nit (not implying they can't be rendered on LDR displays of e.g. 100 nit peak brightness, typically after suitable color mapping).

BACKGROUND OF THE INVENTION

Recently a number of HDR encoding technologies have been proposed, like e.g. the dual layer method of Dolby (WO2005/1040035). However, the industry is currently still looking for a pragmatic HDR video (/image) encoding technology with fits with (a balance of) all requirements, such as the very important factors like amount of data but also computational complexity (price of ICs), ease of introduction, versatility for the artists to create whatever they like, etc. In particular, a dual layer approach is seen as complex. One would ideally like to be able to design a coding which fits with legacy encoding, such as e.g. DCT-based MPEG HEVC encoding. A problem is that this is somewhat counter-intuitive (how ever can one encode a HDR image, which should by definition be something different from an LDR image, typically having a larger amount of interesting brightness/luminance ranges, in a technology optimized for containing particular LDR images, i.e. to be viewed on displays with peak brightness of about 100 nit and dim surround). These legacy LDR image handling/coding systems were designed and optimized to work with typical LDR imaging scenarios, which are normally well-lit with e.g. a 4:1 in studio illumination ratio (or e.g. 10:1), giving for most of the objects (which can vary in reflectance between say 85% for white and 5% for black) in the view a total contrast ratio of about 68:1 (resp. 170:1). If one looks at relative rendering of the luminances starting from a peak white, a typical early LCD monitor without local dimming would have had something like 100 nit white and 1 nit black which would match with the image contrast ratio, and typically one thought that on average CRT systems which might have been watched also during the day would have something like a 40:1 capability. Having a standard luminance code allocation gamma function of 2.2 in these systems seemed satisfactorily for most scenarios of even higher scene contrast. Although some at the time regarded as acceptable errors were made, such errors of rendering of badly encoded high luminance scene regions (e.g. hard clipping) were also acceptable because LDR displays couldn't render those physically accurate anyway.

However there are scenarios for which there is a desire to improve the rendering, like e.g. an indoors scene in which one can simultaneously see the sunny outdoors, in which case there may be an illumination ratio of 100:1 or even more. In LDR those regions will show up as (soft)clipped (typically already in the encoded image having difficult to discriminate codes around the maximum 255 for those pixels), whereas on a HDR display we would like to show them both bright and colorful. That would give a much more naturalistic and spectacular rendering of such scenes (as if you're really on holiday in Italy), but even scenes where the higher brightness content is only composed of some specular reflections already show a major visual quality improvement. If not already artifacts like clipping or quantization errors look annoying on e.g. a 5000 or 10000 nit display, at least we want to be able to drive such displays with the right kind of image, so that also the rendering will be as beautiful as the display allows.

Classical wisdom was however that to encode additional over-brightness ranges, one would need to have (much) more bits. That could happen either by natively encoding in single larger code words (such as OpenEXR with 16 bits of which a sign bit, 5 bits exponent, and 10 bits mantissa, or Ward's LogLuv encoding, which mathematically rigourously tries to capture the entire world of possible object luminances with high precision), or by using a first layer with standard LDR range codes (e.g. a classical JPEG approximation of the HDR image), and a second layer to improve such pixel luminances to higher brightness (e.g. a boost image to boost each pixel if needed to a higher luminance, i.e. a multiplication of two such 8 bit images being equivalent to a single linear 16 bit code).

A major practical problem to be solved when designing a practical HDR coding technology, in addition to the fact that of course it must be able to handle a huge range of different HDR images, is that hardware manufacturers desire lower amounts of bits per code word (channel) however, and although our below proposed technology can also work with larger bit words, we come with a solution that works nicely under a limitation of 10 bits for at least a luminance (or more precisely a luma) channel. Furthermore, we developed a framework which can do in a dual philosophy both color pixels encoding and color appearance conversion for several rendering scenarios in a functional manner, which means only functions need to be co-encoded instead of for each picture at least a second picture. And by researching and developing this path we discovered what would prima facie not be trivial and disclosed in this patent application that we could really make the system work with good quality by choosing the appropriate function(s) on a luma axis, and even encoding the other two components in a luminance-independent chromaticity plane, which after the development offers further advantages of this coding like free choice of color plane (e.g. for wide gamut), easy calculations inside the codec space itself, etc.

SUMMARY OF THE INVENTION

We need to have an improved encoding of HDR images, and in particular, started with the philosophy that especially at the current moment when there are still many legacy LDR systems out there in the field, we need some levels of compatibility. This means on the one hand that we would like to keep using existing (de)coder ICs which implement functionality like (I)DCT [first level compatibility], but also there needs to be second level compatibility with displays which need LDR images because they can only render LDR (i.e. the correct LDR look under such a display dynamic range capability, e.g. with the dark regions still being sufficiently visible), because in addition to the presently deployed legacy TVs, in the further future there will be a spectrum of displays ranging from low brightness capability small portable displays like laptop or pad-computers or even mobile phones on which a consumer also desires to see some rendering of a HDR movie, up to the most advanced HDR displays, which in the future may have a peak brightness of e.g. 10000 nit, and all displays in between or around those. Then although the display may still be legacy and simple, it could be served by a high complexity new decoding and color mapping IC in e.g. a settopbox or computer supplying the HDR content via e.g. a HDMI or other connection, that settopbox offering any combination of the options we invented and described. We have converted this into an approach in which one would in the ideal scenario need (at least) two gradings for the same movie or pictures from the content provider, which we will simply call an LDR image (to be used for LDR display scenarios, e.g. with displays with peak brightness around 100 nit) and an HDR image (for the brighter displays), but the below embodiments are also useful even if one encodes only a single HDR image (e.g. on a blu-ray disk, and then either serves only a particular envisaged range of HDR displays, or derives a mapping for out-of-range displays in an independent manner), and we present the teachings so that they can fit in any envisaged strategy.

So for several practical example scenarios we have as starting point for the novel HDR encoding as input a master HDR graded image (let's say it's graded at will according to whatever the creator's taste was with whatever color processing software, and e.g. encoded in a starting color encoding like OpenEXR), and need to encode this then in a way which is practically usable for current video or image technologies (i.e. only minorly modified from the normal way to use such coding technologies, but not that e.g. all busses need to be changed to 12 bit, i.e our methods should work with 12 bit hardware, but also if only 10 bit per component is available, or if one accepts some lower quality even on 8 bit systems), for e.g. a new BD-disk player, or television IC receiving internet streamed video, or any receiver connected to whatever image source largely compliant to a variant of current image/video encoding technologies.

We have come to the realization that a HDR image and some "LDR" image (whether it is a grading to be used directly for LDR rendering, or just some "pseudo-image" not to be seen but merely for encoding an image which will only be rendered in an HDR way on HDR technology after further color processing) may be linked to the HDR image by a functional transformation on the color component which encodes the luminances of the pixel colors (a single function, or one of typically a limited set of useful and pre-agreed functions, which pre-agreement should at the latest happen when a content creation side is functionally linked with a content receiving side, such as e.g. at the beginning of a movie and possibly a couple of times during playing time for e.g. a television receiving a movie: i.e. when they are not fixed and agreed for encoding many full movies, if variable these functions may be transmitted via a network communication path, stored on a connected memory device, etc).

Our invention can be realized e.g. in at least the following ways:

A method of encoding a high dynamic range image, comprising the steps of:
  inputting pixel colors of an input high dynamic range image, wherein the pixel colors have information of a luminance and a chromaticity;
  applying an inverse of a mapping function to derive a luma code (v) of the luminance of a pixel color, which mapping function is predetermined as comprising a first partial function which is defined as $$P = \left(\frac{\rho^v - 1}{\rho - 1}\right),$$

in which rho ($\rho$) is a shape tuning constant, and v is the luma code corresponding to a luminance (L) to be encoded, and a second partial function defined as $L=L_m P^\gamma$ in which is a gamma transform, and wherein Lm is a peak luminance of a predefined reference display, and gamma ($\gamma$) is a constant which is preferably equal to 2.4,
  outputting a matrix of pixels having a color encoding comprising the luma codes (v).

This function can then be used to encode at least the HDR master image, with colors having normalized versions of N bit luma Y' e.g. [0-1023] codes, in the interval [0,1] given the symbol v, guaranteeing that all interesting luminance ranges of the various objects in the image(s) (which can be many, e.g. an Egyptian souk with a person in the shadow, but also a second one being lit by strong sunlight shining through holes in the roof, but video may also contain graphics like e.g. a weather map, or lasers in a reporting inside a disco, or artificially simulated lasers, etc.) are encoded with sufficient precision. So this function can be smartly predetermined or determined on-the-fly so that it reallocates luminances to lumas before uniform quantization. When designing this luminance mapping function (or more precisely as starting point a corresponding Electro-optical transfer function EOTF which maps luma codes in [0,1] to renderable luminances on a reference display) we had several technical behaviour criteria in mind. Firstly, although (partial) logarithmic behaviour is a nice feature to have to be able to encode many decades of luminance, this is definitely not merely a logarithmic representation of some linear range of luminances (definitely not merely to obtain only a desired image processed look taking only into account image processing reasonings, and also not a mere cut-out adaptive log function be it for optimal encoding). On the contrary this function was designed after several considerations emerging from long experimentation, and given these considerations, it was seen as an optimal behavior function for all criteria (at least good HDR quantization precision) after being able to define a universal linear reference luminance range defined (e.g. 0.0001-5000 nit) for sufficiently realistically representing the necessary appearances of all in practice occurring HDR scenes. Note that formally our reference EOTF(s) have exponential parts in them, but one can also see and describe that as "logarithmic" behaviour the other way around. Now having that reference range it is most useful to have some "logarithmic" behavior for the bright luminances (or lumas) and some gamma behavior for the darker ones. Indeed mathematically approximating exp(x) as 1+x we say that in the darks we have predominantly gamma behavior, which means we have an easily controllable function because we can tune the needed precision in the darks with the parameter rho (the gamma being the further shape controller given 1 to 1 mapping at the maximum because the maximum code steering the display corresponds to the maximum displayable luminance). Not only is that useful for having a single master EOTF for HDR only image encoding, but the gamma is also very useful if we have different classes of HDR images. In fact, if we don't decide to apply a single optimal function reasonable for all scenarios, we can tune the EOTF (and corresponding inverse OETF). E.g., the skilled reader can imagine that an image of a dark basement will on the one hand have the viewer's eye adapted to see more dark grey values, in particular in dark surround, and on the other hand probably have more relevant dark grey values (since all those objects with various reflectances badly illuminated will all fall in the dark), and the brights, particularly if they are just lamps, may not need ultimate precision. Vice versa, if one is looking at a sunny scene with mostly very bright luminances (e.g. between 1000 and 3000 nit), ultimate precision may not be needed for the darks, which the visual system will typically ignore to a large extent. All this can be easily tuned with our gamma and rho shape parameters which control the shape behaviour in the darks versus the brights, and also the amount of just noticeable differences each luma step in a particular subregion of the luma code range corresponds with (also called coding resolution or precision). A fixed pre-agreed parametric function need not have its parameters communicated to the receiving side as it will use the pre-agreed function to decode what the newly invented codes actually mean, but in the more generic case of adaptability, the required parameters (at least one of peak brightness Lm, rho and gamma) as chosen at the receiver end—e.g. by a human grader or an automatic image analysis program—will be communicated to the receiver side by any of a number of possible mechanisms such as e.g. co-encoding on a memory like a BD disk, co-transmittance as metadata in an image signal, retrieval at play time via another signal communication path, etc.

But also something else interesting happens with this technology: this function when creating an encoding of the HDR input also creates a lower dynamic range image (which one could say is better codable in a smaller amount of bits, but a more accurate technical formulation would be that at least some more important subpart of the scene, or a subrange of the image histogram, is be encoded with luminances more closely to middle grey compared to the original inputted master HDR image), although on the other hand preferably at least to a high degree of approximation that encoded LDR image also still has all the information to recover that original master HDR look, so it contains all significant data of the HDR image. So if the EOTF parameters are well-chosen, the resulting encoded image may even be used directly without further optimizing color processing for rendering on an LDR display yielding a reasonably good quality LDR look, or at least after some further second order optimization transformations (e.g. mapping to a different set of LDR display primaries etc.).

When encoding with a single master EOTF function (if we use a single one rather than a selected one out of a number of available ones), we can define that function generically without taking rendering side specifics into account, i.e. although defined by means of a reference display still mostly scene-referred only having in mind sufficient coding of the image textures of at least the HDR look. But preferably we encode also even an LDR look, preferably already positioning the various captured scene objects along the luma axis in correct luma subranges, so that the LDR look when directly displayed will look as preferred by the content creator. But we can also already encode for a particular viewing application, yielding with a further optimized luma allocation function as master function the luma codes giving best quality for viewing in e.g. a dark or dim environment characterized with a reference illuminance say 15 lux, or a reference environmental luminance of say surround middle grey (18% reflection), say e.g. 10 nit. This can be done by incorporating the extra gamma function, e.g. a 1.25 in some embodiments. Ultimately this corresponds when we model all desired partial gammas as an optimal final gamma to changing the gamma in our main embodiments of the EOTF. All variants realize the best image object texture quality for a particular amount of available bits, or in other ways guarantee we can get good quality for relatively few bits, like e.g. only 12 bits, whilst also offering wide color gamut capabilities if we use a large color plane in the chromatic direction like e.g. UCS 1976 CIE (u,v), which turned out to be our preferred choice.

We also invented how this inverse EOTF to map from luminance to luma codes (also called opto-electronic transfer function OETF mapping the optical measurements of luminances say from a camera or color processing software to resultant electrical codes typically being digital, which can be seen as a unit interval [0,1] times $2^N$ where N is the amount of bits) and its corresponding EOTF can best work with a corresponding optimized (theoretical) HDR reference display (with an actual display having the same characteristics as the theoretical one being able to directly render the theoretical codes). Irrespective the final display on which the video needs to be rendered, the video with its luma codes has to be defined in a unique non-confusable manner (in principle the code creation side can then use any principle to allocate codes, but we assume for simplicity in the further elucidation it just encodes a linear captured range of luminances straight from camera with the inverse of the EOTF). In principle one may use the log-gamma function we invented with any desired Lm peak brightness or also called peak white or more precisely peak luminance of the reference display (for completeness what the skilled person calls peak brightness of a display is the most luminous color a display can make, which is a white which occurs when driving the three R,G,B channels to their maximum, e.g. 1023, and it also forms a starting pole for defining a display color gamut around it), but after many analyses we found 5000 nits to be a very good practical value if only one value should be used (then one doesn't need to co-transmit with the video images (pixel color encoding) to any receiver the particular reference peak white value used for the encoding, and e.g. no confusion can occur). In such a scenario one can grade raw input luminances above 5000 nit to faithfully rendering equivalent appearance luminances for ultimate display within the e.g. 0.0001-5000 nit reference luminance range, and where desired if such data is to be displayed on say a 20000 nit actual display, upgrading functions can be added as metadata for optimizing this look given all its information on even brighter actual displays than the reference display. One should not confuse this first strategy for artistically redetermining scene colors of e.g. 25000 nit which are outside our reference-luminance basis master color space to color within the master space, to the present teachings on how to redetermine colors which are already within a particular RGB space (i.e. two color gamuts with the same primaries yet different peak white can still be made to collocate once renormalized to [0,1], and one of those would typically be our master RGB space defined by our master luminance axis, and the other any coded R'G'B' space with any of the present loggamma functions). Also images graded for lower dynamic range displays (e.g. 1200, or 100 nit) or dark misty scenes going only to 50 nit can be encoded in this master [0-5000] luminance range, and then, what should not be confused, converted to our universal luma encoding (i.e. still an allocation of luma codes should happen either with a fixed or variable code allocation EOTF). We teach a luma-(u,v) chromaticity space decoupling the dynamic range aspects from the chromatic aspects, and allowing much versatility in both directions and in particular along the luma axis, e.g. as to what luma allocation function has to be used, but also reallocation functions, e.g. when mapping for displays of other peak brightness within this encoding color space.

The optimal values of gamma 2.4 and rho 25 have after several considerations and experiments been found in case one wants to use one single luma allocation function for all scenarios (e.g. images with at the same time some bright regions, middle-bright regions and dark regions), in particular if one wants to encode HDR only (i.e. although we can co-encode as metadata further mapping functions for deriving a desirable LDR look from the HDR pixel image encoding, we need not necessarily in all embodiments obtain a good LDR look by displaying directly the image resulting from applying this optimal single log-gamma function).

Several chromaticity representations could be used with our luma definition approaches, but we found (u,v) space in particular to work well. We can also define (u',v') which are defined references to a chosen white e.g. as: (u',v')=(u,v)−(u_D65,v_D65), etc.

When we state that an input color comprises information of a luminance and a chromaticity, we do not imply that such color is perse represented in such a color representation, but that this information can mathematically be derived, which is fulfilled e.g. if the input image is represented in XYZ or some uniquely defined RGB, etc. Although we come with a fundamentally new way to define luma useful for the emerging HDR encoding technology, the skilled reader will from our teachings understand how he can define e.g. from RGB coordinates the lumas, by first weighing the RGB coordinates given a desirable white point balancing defined as $Y=a1*R+a2*G+a3*B$, with a1, a2, a3 constants which can still be chosen given particular R,G,B primaries and a white point choice. Then those luminances Y are processed with our EOTF.

Also the skilled reader will understand how we can derive information of an image to be ultimately outputted, which we can call Rec_HDR (a close reconstruction of a desired master HDR input), and this may be advantageously done e.g. as XYZ_output (n.b. we use the character Y or also L for luminance and Y' for luma or also v if luma is normalized [0.0, 1.0]). But we may also convert Rec_HDR to another color representation like e.g. a particular R'G'B' or other device-dependent encoding for driving a particular display. Furthermore, Rec_HDR may also be a further HDR image, e.g. we may either directly map to a required driving RGB image to render the desired look on a 1200 nit display, or alternatively map a first Rec_HDR1 (e.g. for our 5000 nit reference display) to Rec_HDR2 via an intermediate step, for driving say an 1200 nit actual display.

This metadata (rho, gamma, and if desired Lm) being new means that we can of course also define a new not related to any previous technology image signal comprising this metadata (although it's usable with whatever legacy strategy used for encoding the pixel matrix color components, whereby we do enforce Yuv coordinates in say an MPEG-HEVC structure which expects YCrCb, but the rest of the (de)coder doing e.g. DCT or run length encoding etc. doesn't care, as long as we have a part of an IC or software which does the conversions according to our embodiments). So although that "formatting" part may indeed be any legacy image technology similar to an MPEG or JPEG or other image or video encoding, the actual image textures when filling the pixel codes according to our new strategy will already be (verifiably) fundamentally different (without the proper understanding of what happened this image looks technically so different that a legacy encoding will render a fully incorrect image look, although technically it could do all decoding steps). In fact this understanding of Philips's several inventors working on this future image coding project was that one needed for the future some system which is somewhat similar to the OSI model of communication. When technology progresses, in many areas it becomes so complex that it has to be defined in a more structured manner, but the question was how to do that. In image handling technology there were already solutions for putting the image in an outer container (e.g. describing which audio and video component using which encoding strategy are comprised, or splitting this up in chunks of data for e.g. IP transfer or broadcast carouseling), which is the simple correlate of classical OSI, but one layer still was fully rigid, using its specific direct encoding like e.g. Rec. 709 (everything defined for a single envisaged fully defined system, of particular RGB primaries, an envisaged typical viewing environment etc). With the signal "comprising" the parameter metadata (or the metadata of definition and/or color transformation functions being associated with a pixel color image) we mean that in any which way the metadata is conveyed to the receiving side, whether e.g. at the same time in a same signal, or having the pixel color matrix coming at a first time via a first communication channel, and the metadata later via another, ultimately at the decoder all this required data comes together. So we may put the signal (pixel colors+function metadata) on the same blu-ray disk, or communicate it over a network like broadcast or internet via some pre-existing or future image or video communication technology, etc.

An optimal function can be determined for HDR-images only in the image signal (e.g. only a HDR look on disk, and no LDR pixel matrix, only potentially some color mapping functions to derive an LDR look image) with Lm=5000, rho=25 and gamma=2.4. Instead of Lm=5000 the method can also be used when a content creator desires a higher Lm value (e.g. 10000 nit) or a lower one (e.g. 2000 or 1500).

One may also design further gamma values, and e.g. a gamma partially taking into account a desired environmental rendering can be determined, e.g. by defining the final gamma composed of an equivalent gamma of a Rec. 709 encoding gamma and the gamma 2.4. With equivalent gamma the skilled person will understand that this is not the value of gamma in the formula which also has a linear part, but the gamma best approximating that Rec. 709 encoding OETF when starting in the blacks as a gamma rather than a linear part.

A method of encoding a high dynamic range image in which the parameters rho and gamma, are further optimized to yield an encoded image which looks good according to a human color grader on a 100 nit display, whereby the at least one of the parameters rho and gamma is preferably optimized by a human grader. Although some variability will exist, there clearly is a range of parameters which will—depending on the scene—give a reasonably looking LDR counterpart for the HDR image, so this is a method which can be positively defined and identified. Because of the variability and complexity of images, usually in the process a human color grader will determine the best looking LDR image, and hence the corresponding rho and gamma parameters. However, at least partially automatic image analysis algorithms may come with values which look good, and then e.g. typically the grader only has to verify that the produced LDR look is indeed to his liking, e.g. by merely clicking an accept button before all data (image pixels+functional metadata describing one or more color transforms to one or more looks) is written into an image signal encoding. For curves which favor more the dark images/scenes one can shoot (e.g. a night scene, with no or perhaps a few small lights, like the moon in the back), a larger part of the codes will typically be made available for the darker colors in the scene, which may happen when choosing e.g. a larger value of gamma, e.g around 2.55 (and an optimal rho can be chosen for this). For images which have proportionally a larger amount of brighter objects (e.g. when there are only a couple of smaller patches with luminances much darker than the maximum object luminance in the image or Lm), smaller values of gamma may be used, e.g. 2-2.2 (2.15 being a good example), or even lower than 2 and larger than 1, e.g. 1.2.

Corresponding to the method there can be several variants of an image encoding apparatus for encoding a high dynamic range image, comprising:

an input for obtaining pixel colors of an input high dynamic range image, wherein the pixel colors have information of a luminance and a chromaticity;

a grading managing unit (202) arranged for applying an inverse of a mapping function to derive a luma code (v) of the luminance of a pixel color, which mapping function is predetermined as comprising a first partial function which is defined as $$P = \left(\frac{\rho^v - 1}{\rho - 1}\right),$$

in which rho is a tuning constant, and v is the luma code corresponding to a luminance to be encoded, and a second partial mapping defined as $L=L_m P^\gamma$ which is a gamma transform, and wherein Lm is a peak luminance of a predefined reference display, and gamma is a constant which is preferably equal to 2.4, an encoder (210) connected to a video transmission connection (221), connectable to a video memory or network, arranged to encode and transmit an image signal S_im comprising a pixel matrix image with pixel colors encoded with one color component being the luma code, and associated therewith metadata comprising at least one of the rho and gamma parameter. One typical variant may be a grading suit (the software which the grader applies to determine at least a HDR image, but now with our particular technologies incorporated to derive encodings and/or graded looks), but the apparatus may also be e.g. inside a camera, in which case e.g. rho and gamma may be changed either together or simultaneously with one or two turning knobs. The skilled person will understand how a video transmission connection 211 may typically be embodies, as this may e.g. be a standardized video cable output, a protocol for encapsulating video in e.g. internet packets, a protocolized hardware for writing on a bluray disk, etc.

Corresponding to the encoder there can be various decoder which operate largely similar, i.e. although there may still be some further variations on both encoder and decoder side, the core of the code allocation as presently described should be uniquely understood by any receiver once encoded.

An image decoding apparatus (301) for decoding a high dynamic range image encoding (S_im) comprising:

a receiving and formatting unit (388) arranged to receive the high dynamic range image encoding (S_im) and derive therefrom an image encoding (Im_1) comprising luma codes, resulting from an encoding method as defined in claim 1, to be processed;

a color mapping unit (305) arranged to apply a color mapping strategy to derive from the image encoding Im_1 a high dynamic range image (REC_HDR), wherein the color mapping unit is arranged to apply on pixel lumas v in the image encoding (Im_1) a predetermined mapping function defined as comprising a first partial function which is $$P = \left(\frac{\rho^v - 1}{\rho - 1}\right),$$

in which rho is a tuning constant, and v is the luma code corresponding to a luminance to be encoded, and a second partial mapping defined as $L=L_m P^\gamma$ in which Lm is a peak luminance of a predefined reference display, and gamma is a constant which is preferably equal to 2.4 to obtain luminances L of pixels of the high dynamic range image (REC_HDR).

Of course as a variation, instead of or in addition to decoding to a reference [0-5000] luminance range and the color space constructed therefrom (e.g. XYZ), various decoders may also decode to another image as output. E.g. in addition to an output for outputting a reconstruction Rec_HDR of a HDR look, the decoding apparatus may have a second output (or the same output depending on what a connected system like a display requests as output image) for an LDR image.

We further invented some interesting embodiments like:

A method of encoding a high dynamic range image, comprising the steps of:

determining a mapping function for deriving a lower dynamic range image (LDR_CONT) from an input high dynamic range image (HDR_ORIG), wherein a luminance-correlate (L) of a pixel of the high dynamic range image (HDR_ORIG) is converted to a luma (Y) of a pixel of the lower dynamic range image (LDR_CONT) by applying a function determined as $Y=c*\log_{10}(a*L^{1/\gamma}+b)+d$, wherein the coefficients are specified so that the function is normalized such that for L and Y values in an interval [0,1] a value L=0 maps to Y=0, and L=1 maps to Y=1, and there is a further constraint specified implementing near a Y-value in the middle of the Y-range a certain behavior of the function, so that the shape of the function is controllable with a single parameter a, and, transmitting to a video transmission connection (221), connected to a video memory or network, one of the lower dynamic range image (LDR_CONT) and the high dynamic range image (HDR_ORIG), and at least the parameter a.

This well chosen logarithmic function allows to generate an optimal mapping which may then be uniformly quantized with minimum visible error in particular if one has available only 10 bits for the luma component (and e.g. 8 bits for the chromaticities u and v).

The resulting image LDR_CONT may be called an LDR image, as it is a kind of contrast-smoothed version of the HDR image with brightness effect in various luminance subregions. If one chooses the right code allocation function one may even use this LDR_CONT for direct rendering of the program on an LDR display, but that is not required for all embodiments of our invention, since some may merely use LDR_CONT as a dummy intermediate for HDR-only encoding.

A method of encoding a high dynamic range image in which the further constraint defines for a Y-value at or near the middle of the Y-range, a functional relationship between the resultant L-value obtained by applying the power function ($L^{1/\gamma}$) being the inverse of the function in claim 1 and the parameter a, such as e.g. $L^{1/\gamma}(Y=1/2)=K/a$ in which K is a constant. Advantageously one defines a particular smoothness of the curve in these regions where the most interesting action occurs.

A method of encoding a high dynamic range image in which the a-parameter has a default value, which value may depend on a peak brightness of a reference display typical of a display which will use the signal. Typically a grader may envisage this grading for 1 or may be a couple of ranges of displays, e.g. the HDR reconstructed image is optimal (i.e. with least artifacts like banding) for e.g. 5000 nit peak brightness displays or close to that. In some embodiments the functional mapping FH2L is then also interesting because the LDR_CONT image provides a suitable image for e.g. displays around 200 nit, and there may even be a further function per e.g. scene (or for the entire program) co-encoded to get an optimal image for rendering on e.g. a 15000 nit or 50 nit display.

A method of encoding a high dynamic range image in which a human color grader determines an optimal value of a to be transmitted to to video transmission connection (221).

Preferably our technology on the creation side allows to select optimal a-values, e.g. for least artifacts in critical regions, or a good overall color look etc. The receiving side need not know the particular algorithm for associating an a-value with whatever physical characteristic(s) of encoded image(s) and or intended display(s), but rather it only needs to know which (inverse) function to apply, i.e. with which functional shape the a-value corresponds.

A method of encoding a high dynamic range image in which an automatic image analysis unit (227) determines the value of a depending on at least one summary value characterising the luminances of the pixels in the high dynamic range image (HDR_ORIG), such as e.g. a median of those luminances, or a delimiter luminance of a range of occurring luminances. Also the human grader can specify where the interesting values in the image are, e.g. he can scribble on an image, an the unit 227 can then establish that these are mostly bright colors e.g. 95% lying above code 0.7.

There can be several deciding algorithms pre-designed in the encoding unit.

A method of encoding a high dynamic range image in which the chromatic coordinates (u,v) of the color encoding are derived from CIE XYZ-coordinates of the colors of pixels in the high dynamic range image (HDR_ORIG) by fractional equations of the type:

$$u = \frac{aX+bY+cZ}{dX+eY+fZ} \text{ and } v = \frac{gX+hY+iZ}{jX+kY+lZ},$$

with a ... l constants, and preferably with values: a=4, b=c=0, d=1, e=15, f=3, h=9, g=i=0, j=1, k=15, l=3.

An image encoding apparatus for encoding a high dynamic range image, comprising:

a grading managing unit (202) arranged for determining a mapping function for deriving a lower dynamic range image (LDR_CONT) from an input high dynamic range image (HDR_ORIG), wherein a luminance-correlate (L) of a pixel of the high dynamic range image (HDR_ORIG) is converted to a luma (Y) of a pixel of the lower dynamic range image (LDR_CONT) by applying a function determined as $Y=c*\log_{10}(a*L^{1/\gamma}+b)+d$, wherein the coefficients are specified so that the function is normalized such that for L and Y values in an interval [0,1] a value L=0 maps to Y=1, and L=1 maps to Y=1, and there is a further constraint specified implementing near a Y-value in the middle of the Y-range a certain behavior of the function, so that the shape of the function is controllable with a single parameter a, and, an encoder (210) connected to a video transmission connection (221), connectable to a video memory or network, arranged to encode and transmit an image signal S_im comprising one of the lower dynamic range image (LDR_CONT) and the high dynamic range image (HDR_ORIG), and at least the parameter a.

An image encoding apparatus comprising a user interface unit (203) allowing a human grader to select a particular value of a.

An image encoding apparatus comprising an automatic image analysis unit (227) arranged to determine a particular value of a, e.g. based upon such parameters as a peak brightness of a display for which the encoding is done, and/or luminance statistics of the high dynamic range image (HDR_ORIG).

An image encoding apparatus in which the grading managing unit (202) is arranged to determine the chromatic components of the pixels of the high dynamic range image (HDR_ORIG) which because of the luma-independency would also be the chromaticities of the lower dynamic range encoding (LDR_CONT) of the original HDR input as:

$$u = \frac{aX + bY + cZ}{dX + eY + fZ} \text{ and } v = \frac{gX + hY + iZ}{jX + kY + lZ},$$

with a ... l constants, and preferably with values: a=4, b=c=0, d=1, e=15, f=3, h=9, g=i=0, j=1, k=15, l=3.

An HDR image encoding signal comprising an encoding of an image of pixel values and, at least a value of parameter a of the function of claim 1.

Although some embodiments may transfer entire function definitions (e.g. for a receiver which may not have pre-agreed function knowledge, or if standard only one curve is agreed, but the creation end wants to use another curve, which it then needs to signal to any receiving side), if the functions are simple like in some of our embodiments, communicating merely one or a few coefficients may be sufficient to recreate their functional shape.

A memory product such as a blu-ray disk or a memory stick etc. comprising the HDR image encoding signal.

An image decoding apparatus (301) for decoding a high dynamic range image encoding (S_im) comprising:
  a receiving and formatting unit (388) arranged to receive the high dynamic range image encoding (S_im) and derive therefrom an image encoding (Im_1) to be processed;
  a color mapping unit (305) arranged to apply a color mapping strategy to derive from the inputted image Im_1 a high dynamic range image (REC_HDR), wherein the color mapping unit is arranged to apply on pixel lumas Y in the image encoding (Im_1) an inverse of the mapping function $Y=c*\log_{10}(a*L^{1/\gamma}+b)+d$ to obtain luminances L of pixels of the high dynamic range image (REC_HDR), and a, b, c, d, and γ are constants known to the image decoding apparatus.

At minimum a decoding apparatus (which may actually be a small part of an IC, and this may be included in any larger consumer or professional apparatus, like e.g. a television, phone, cinema projector, viewing boot system during program production, etc.) must be arranged so that it can follow our encoding principle to have a high dynamic range image with potentially many luminance ranges up to very high luminance all having their information in an image smartly packed as if it was a normal image, i.e. it must be able to apply the inverse of any of our proposed standard code allocation functions for the achromatic component i.e. the luminance or luma of the HDR object colors as encoded in what is an HDR image signal but looks like an LDR image signal, and then do some color transformation compatible with that luminance definition to enable putting possibly high luminances in a standard color encoding gamut. So it may be that nothing actually needs to be communicated, e.g. if certain systems of e.g. a future MPEG-type X standard use only 1 standard luma allocation curve, then any receiver will already know the parameters, and have them stored in memory, e.g. in the processing algorithms stored in that memory, or equivalently in IC circuitry. However, in embodiments in which some of the curves can vary (e.g. for a dark scene in a movie using another curve than the rest of the movie), it may be that the receiving end can with some algorithm uniquely determine which code allocation curve had been used during encoding, but preferably some information is communicated via any method so that the receiving end is also absolutely sure which definition of the luma codes Y was used in this image Im_1. Then the minimum core decoding unit or apparatus just An image decoding apparatus (301) for decoding a high dynamic range image encoding (S_im) as claimed in claim 13 wherein:
  the receiving and formatting unit (388) is arranged to derive from the high dynamic range image encoding (S_im) at least one parameter defining the shape of the mapping function, such as an a-parameter value, and possibly also a gamma value γ to derive the inverse of the mapping function.

The creation end can transmit the parameters, and because some of our embodiments can determine the other parameters if only 1 parameter is sent, this is a very useful manner to send 1 out of a family of curves with different behaviour regarding allocation of certain subregions of the luminance span of the HDR image to the gamut of code space. E.g. gamma may be fixed and pre-agreed, and one sends only an a-value, e.g. somewhere within or attached to the image(s) data, or via a separate communication path (e.g. a television station could indicate it will be using a certain a-value from now on, and regularly communicate this), etc.

An image decoding apparatus (301) for decoding a high dynamic range image encoding (S_im) as claimed in claim 13 or 14, in which the color mapping unit (305) is arranged to apply a transformation to map the u and v component of the pixel colors of the inputted image Im_1 to a universal color representation like e.g. a CIE XYZ space.

As described in the text, preferably we apply the luminance direction allocation with a smart allocation of the colors in the chromatic direction, so that the total error (e.g. deltaE2000) of quantized colors is not to large for any ultimate use of the image, i.e. at least the reconstructed REC_HDR, and may be even a further processed version thereof, which e.g. boost from reference level 5000 nit of the reference display for which the HDR signal was encoded to an actual 10000 nit display. The decoder then needs to do the inverse of this color space mapping, which will typically be implemented by mapping the Yuv colors to some universal color space like linear XYZ.

An image decoding apparatus (301) for decoding a high dynamic range image encoding (S_im) as claimed in any of the above decoder claims in which the color mapping unit (305) is further arranged to apply a second color mapping strategy to derive high dynamic range image (REC_HDR) an image with lower or higher luminance dynamic range than the reference dynamic range. Decoding the encoded image to the reference [0-5000 nit] range is useful because then we have a real physically realizable image. Of course, typically the actual display connected may e.g. be a 1200 nit display. So ideally, instead of just scaling the [0-5000 nit]

display to the 1200 nit peak white by directly driving the display, some further optimization of the look is desirable (this could be done as a second step from the reference image Rec_HDR, or already immediately as one step algorithmic color transformation from the Yuv color encoding). There will typically be at least one image derived, the dynamic range of which depending on which typical dynamic range was best associatable with the particular look encoded in the pixelized image. If e.g. LDR was written in the signal S_im, it may be typical that some upgrading is performed, to derive from the (typical 100 nit peak white) LDR look an HDR final driving image for e.g. a 1500 nit display. Of course if the look was HDR, downgrading for LDR displays may be involved, and in general several regradings could be involved. To obtain these new images, actually all the data (function constants for parametric functions like color transformations, lookup tables, etc.) for these various luminance/color mapping functions (e.g. HDR to LDR and an in between medium dynamic range MDR look) may actually be co-encoded as various sets of metadata, but of course the receiver can also derive some of the mappings itself (e.g. if a regrading of HDR to LDR was co-encoded as metadata, the receiver can derive its own estimate of a good intermediate mapping for deriving MDR).

In some simpler systems our technology may be used for a single kind of "closed" system, and the intended optimal (reference) HDR display may e.g. be 5000 nit. However, there may be further functional instructions how to map to a driving image for e.g. a 2000 nit display, which will typically be done starting from the REC_HDR, but could be done differently, e.g. by also taking into account the values in the LDR_CONT/Im_1 image.

An image decoding apparatus (301) for decoding a high dynamic range image encoding (S_im) as claimed in any of the above decoder claims in which the receiving and formatting unit (388) is arranged to receive at least a peak brightness of a reference display for which the inputted image Im_1 was encoded, and possibly also a gamma value, and derive therefrom the inverse of the mapping function.

There are indirect ways to uniquely define a code allocation function, e.g. one may pre-agree a number of functions to be used for ranges of peak brightness of the intended (reference) display. An actual display with another peak brightness may then further map the REC_HDR to make it look optimal for its characteristics, but at least it needs to know which code definition was used.

An image decoding apparatus (301) for decoding a high dynamic range image encoding (S_im) as claimed in any of the above decoder claims 13 up to and including 16, in which the receiving and formatting unit (388) is arranged to receive a code such as a sequential number indicating which one of a number of preagreed inverse mapping functions should be used by the color mapping unit (305) to derive from the inputted image Im_1 the high dynamic range image (REC_HDR).

The actual codification and transmission can be done in various ways, e.g. a standard which only allows 3 different curves may transmit that for this program or a part of a program function "2" is used.

A display comprising the image decoding apparatus as claimed in any of the above decoder claims.

A method of image decoding of a received lower dynamic range image (LDR_CONT) comprising:
receiving a high dynamic range image encoding (S_im) and
deriving therefrom an image encoding (Im_1) to be processed, and color mapping by applying a color mapping strategy to derive from the inputted image Im_1 a high dynamic range image (REC_HDR), wherein the color mapping unit is arranged to apply on pixel lumas Y in the image encoding (Im_1) an inverse of a mapping function $Y=c*\log_{10}(a*L^{1/\gamma}+b)+d$ to obtain luminances L of pixels of the high dynamic range image (REC_HDR), and a, b, c, d, and $\gamma$ are constants known to the image decoding method.

A method of image decoding of a received lower dynamic range image (LDR_CONT) as claimed in claim 17, in which the receiving comprises receiving any information uniquely defining the inverse of a mapping function $Y=c*\log_{10}(a*L^{1/\gamma}+b)+d$.

The invention can be realized in many other (partial) ways like with intermediates containing the core technical requirements of the various embodiments like the defining parameters embodied in signals, and many applications of it may result, like various ways to communicate, use, color process, etc. the various possible signals, and various ways to incorporate the various hardware components, or use the various methods, in consumer or professional systems.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept.

DETAILED DESCRIPTION OF THE DRAWINGS

High dynamic range (HDR) images/video typically have a different luminance distribution than the currently used images/video. Especially the peak-to-average luminance ratio of high-dynamic-range image data may often be much higher, e.g. because there are the relatively darker colors of the reflective objects in the room, and then there are a couple of very bright objects like lamps or light effects. Whereas LDR images are typically constructed with more or less a single (at least in the important parts of the scene) illumination of which the illuminance over the objects doesn't vary too much (e.g. 4:1), HDR imaging technology handles the real world which also has scenes with highly variable illumination with some objects being under bright spot light and others being in the shadows of dark corridors. But on the rendering side this also means that one needs to redefine by color mapping the look of the HDR image so that it is better suitable for LDR systems, which means specifying what we will call an LDR grading or grade. Also when merely encoding an HDR image only, the statistic of the luminances doesn't match well anymore with the gamma-2.2 type of luminance code allocations known from the various LDR encoding technologies.

Figure 2:
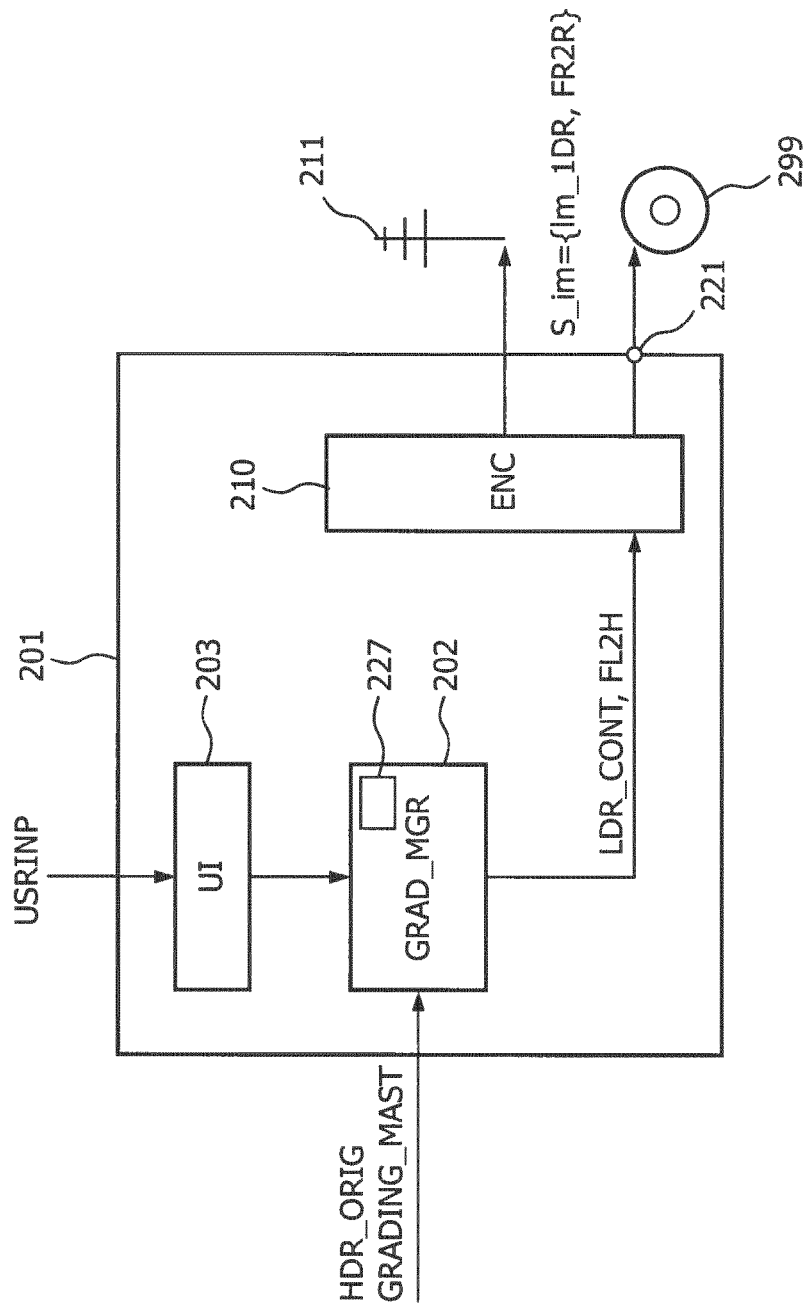
FIG. 2 schematically shows an embodiment of possible apparatuses for grading and encoding HDR image(s) according to the present invention.

In the non-limiting embodiment of FIG. 2 we assume that a grader has already prepared a master grading of an HDR_ORIG, which we assume is e.g. a 3×16 bit linear XYZ image, but in the below we first focus on a luminance-correlate of the pixel color encoding (e.g. a luma code, or luminance value), and we assume this value to be a float [0,1] (the skilled person understands how to make alternative realizations in e.g. a 0 . . . 1024 encoding etc). We assume that grading and encoding functionalities are in one grading apparatus 201, but they could of course also be separate apparatuses (in the core we are just teaching an encoding unit, like a part of an IC). A user interface unit 203 handles grading control (user input USRINP) by a human grader (like all units described here, this may e.g. be a dedicated IC, or software running on a generic processor, etc.), and may be connected to e.g. a keyboard with dials or balls for changing values, in particular the a-value of our curves below, or the rho and gamma values, and even the Lm value may be selectable. Grading managing unit 202 is arranged to determine a mapping curve as explained below, as well as to apply it to an input HDR image or images HDR_ORIG, to arrive at e.g. an according to the grader optimally looking LDR output LDR_CONT, which may be conventially encoded, e.g. with an MPEG-type encoding like AVC, or similar like VC1, etc. The grader may typically be looking at his results on connected calibrated monitors, e.g. if he is determining an HDR encoding as an LDR look in S_im, he may be looking directly at the LDR image (decoded from the encoding, or even still before DCT encoding just the recolored look) on an LDR monitor, and simultaneously on the Rec_HDR image which can be recovered from the LDR image LDR_CONT on a reference HDR monitor of typically 5000 nit white. The grader determines a luminance-correlate mapping function (this could also be mapping between R_HDR and R_LDR in principle etc.) FH2L by which the luminances (or lumas) of the HDR image are converted into luma values of the LDR image (or vice versa, this function typically being reversible, which inverse function FL2H can be used to reconstruct Rec_HDR from LDR_CONT, and typically such an upgrading function FL2H is stored in S_im). In other embodiments of our encoder, this may be done automatically, e.g. with a single fixed code allocation curve (e.g. halfway in this family of curves, to be used for the present movie or video program), or by analyzing the image or a number of successive images (e.g. a shot, scene, or even the entire program), and using e.g. the median or a weighted average luminance or a count of luma occurrences within at least one subrange of the luma range to select a curve via a set of rules: when X<=median<=Y then use curve nr. Z. This mapping function so allows to derive the optimally looking LDR image like the content creator prefers it, once one has available e.g. at a receiving side an encoding of the HDR image, or vice versa an optimal HDR image from an encoded LDR image. The inverse mapping may also readily be determined (as our luminance mappings are typically invertible), whether at the creation side e.g. in the grading apparatus 201 or at a receiving side, and this function then allows recreating a close approximation (after quantization and DCT approximation effects) of the original master grading HDR_ORIG on the basis of an available LDR encoding LDR_CONT. For storage or transmission to a receiving end one could encode any combination of the HDR-to-LDR mapping function FL2H, its inverse FH2L, the LDR image LDR_cont, and the corresponding HDR image HDR_ORIG (and any close approximation of those images, e.g. after bit-saving mathematical transformation). However, for bit budget reasons it makes sense to store/transmit only one of the images. We will assume encoder 210 codes and formats (i.e. does e.g. classical MPEG encoding-like DCT-ing and run length encoding etc) the first (set of) image(s) Im_1DR which define the textures of the still or movie objects, Im_1 being LDR_CONT. It also does prefixed formatting of the chosen particular mapping function(s) FR2R [e.g. one different function per scene of the movie, or a single one for the entire movie], e.g. FR2R=FL2H into a total image signal S_im (the skilled person should understand there are various ways to encode metadata in or associated with an image(s), like e.g. via SEI messages, in a header of some picture, as a separate data track on a disk, as a separately obtainable network communicated signal, and there may be synchronization data like e.g. a time moment in the movie from or at which time to apply a function, etc.). Encoder 210 then e.g. stores this Im_1 and metadata into a memory 299, like a memory product, like a blu-ray disk or solid state memory device, etc., or transmits the signal over some networking technology 211, like e.g. if the grading happens in a television studio for (near) real-time streaming a DVB-T television signal etc. We show one possible video transmission connection (221) which may e.g. be a bus or cable going to a master BD disk, or temporal memory storage on a content-provider owned server, etc., but there may be several such connections for outputting the image signal(s) over various technical systems, e.g. the antenna may also have a second such S_im output connection (not drawn), etc.

We invented a couple of variants of preferably to be applied, typically in a number of standardized scenarios (at least if not as a single mapping, then a first step in a succession of luminance, and typically also color mappings, like saturation mapping) code allocation function(s) OETF (or vice versa EOTF) for going between HDR luminance correlates (which for simplicity we will assume to be just luminances, but they could of course also be any encoding of such luminances) to "LDR" lumas. Advantageously these functions could e.g. realize not necessarily mandatory the following:

1. The effect of applying the curves may be perceived as a brightness change (brightness being the psychovisual effect of a physical rendered luminance).
2. The brightness change should be possible in two directions (both lower and higher brightness) and preferably no or little information/details should be lost (i.e. the curves should be invertible at least in a continuous color space).
3. The images resulting from applying the curves should be perceptually pleasing i.e. the human color grader should be able to make nice or relatively nice images with them (in particular contrast ratios in perceptually relevant brightness ranges should be reasonably preserved perceptually).

But at least in some embodiments we want to make the functions so that they optimally encode that information in the image(s) which is important (and we are talking about images captured typically from HDR scenes), in particular they don't make too large a quantization error over most or all of the subranges of the to be encoded luminance range. By this we mean, if we map to the LDR encoding, and then reverse map to obtain an approximation of the original master HDR grading Rec_HDR, we shouldn't have used such a mapping function that e.g. the bright areas are now too coarsely quantized after a brightness stretch, so that e.g. (too much) banding is visible in bright clouds. This may typically be determined by calculating an error measure like deltaE2000 for a number of critical test images, and indicates how much of a color difference a human will see, if it sees a display with the original unencoded master grading next to our decoded HDR rendering Rec_HDR (which will typically be more critical than solely watching a decoded HDR movie).

For a good embodiment of a family of luminance code allocation functions, we had the insight that since a photographer or Director of Photography aims to keep the relevant image/video parts in the middle of the exposure scale or luma-value axis in order to minimize the risk of too much overexposure of relevant textures (causing loss of detail by clipping in bright parts) or underexposure (causing loss of detail due to excessive noise, i.e. a low signal-to-noise ratio), we may make good use of this in designing a HDR/LDR coding technology. Therefore, the desired brightness (/luminance) changing effect should act/occur around the middle of the scale (i.e. at a "log" value of 0.5 on the normalized range) in order to best provide the desired result on the most relevant image data. In addition, for HDR imaging it may be useful to have a critical look at the quality of at least the darker regions, but also possibly some brighter regions. We have found that the above-mentioned requirements can be met by a family of curves of "logarithmic" nature that has a linear control in the middle of the scale.

The logarithmic curve part that we can apply for relating the LDR luminance-correlate and the HDR-luminance-correlate for decreasing dynamic range in tone mapping can be started from a general first form $v=c*\log_{10}(a*x+b)+d$ where x is the "linear" input value normalized to the 0 . . . 1 range and v is the "logarithmic" output value, also normalized to the 0 . . . 1 range. To increase dynamic range, the inverse curves are used, which are given by $$x = \frac{10^{\frac{v-d}{c}} - b}{a}$$

It should be clear that if on the x-axis are the HDR luminances, then we should brighten-up the dark regions, or compress, i.e. use the logarithmic form to obtain LDR_CONT luma values on the y-axis.

To further specify the curves we impose constraints. The first two constraints are given by the normalized 0 . . . 1 range where input values 0 and 1 are mapped to identical output values, i.e. when v equals 0 also x should be equal to zero and when v equals 1, also x should be equal to 1:

$$0 = \frac{10^{\frac{-d}{c}} - b}{a}$$

from which it follows that $b=10^{-d/c}$ and $$1 = \frac{10^{\frac{1-d}{c}} - b}{a}$$

which can now be rewritten as $$10^{\frac{1}{c}} * 10^{-\frac{d}{c}} - 10^{-\frac{d}{c}} = a$$

Finally, we impose the constraint that in the middle of the log scale, at v=½, the function should be linear with a (providing a linear luminance change at this position when a is varied) which implies that $$10^{\frac{1/2-d}{c}} - b = K,$$

where K is a constant, which can be rewritten as $$10^{\frac{1}{2c}} * 10^{-\frac{d}{c}} - 10^{-\frac{d}{c}} = K.$$

By combining the latter two constraints we eliminate the $$10^{-\frac{d}{c}}$$

term, obtaining $$K*\left(10^{\frac{1}{c}} - 1\right) = a*\left(10^{\frac{1}{2c}} - 1\right),$$

which we solve by substituting $$y = 10^{\frac{1}{c}},$$

giving $K*(y-1)=a*(\sqrt{y}-1)$ with the solution $$y = \frac{K^2 - 2*K*a + a^2}{K^2}$$

The solution is valid for a>2*K. By choosing a value for K, the curves are then specified by the single parameter a, which acts similar to a light sensitivity or film speed parameter, and hence we call a the exposure index parameter for our curves. The value we choose for K is $$K = 8*\sqrt{2}$$

since this value of K results in values for a that approximately correspond to practically used exposure index values.

In Table 1 the C-code implementation of the log curves and their inverse is given, where the variable names correspond to those used in the above equations.

TABLE 1

ANSI C code implementation of the proposed log functions and their inverse.

```
static float LintoLog(float x, float a)
{
    float K,b,c,d;
    K = 8*sqrtf(2);
    c = 1/log10f((K*K - 2*K*a + a*a)/(K*K));
    d = -c*log10f(a/(powf(10,1/c)-1));
    b = powf(10,-d/c);
    return c*log10f(a*x+b)+d;
}
static float LogtoLin(float v, float a)
{
    float K,b,c,d;
    K = 8*sqrtf(2);
    c = 1/log10f((K*K - 2*K*a + a*a)/(K*K));
    d = -c*log10f(a/(powf(10,1/c)-1));
    b = powf(10,-d/c);
    return (powf(10,(v-d)/c)-b)/a;
}
```

Figure 1:
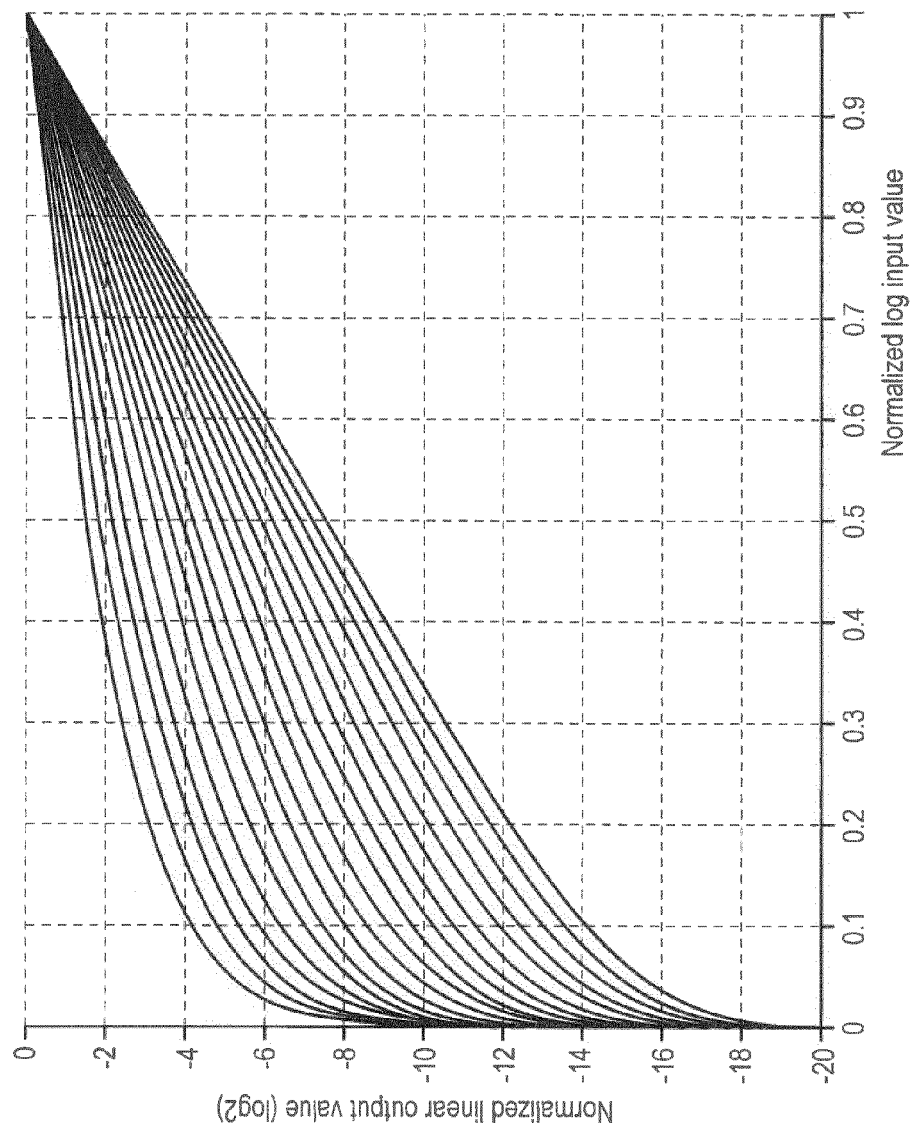
FIG. 1 schematically shows an example of a family of such usable luma code allocation curves for associating what we shall generically call a luma code, with a luminance of an object to be represented, which is to be used by the content creator mandatory, to create a LDR grading corresponding to a master HDR grading (which HDR grading typically means human color look fine-tuning after camera capturing—with either celluloid movie or an HDR or typically enhanced-LDR high quality camera like a RED camera, however one could also generate luminance-improved pseudo-HDR in grading or special effects processing from an LDR camera capturing, wherein a human colorists improves the colors, to remove physical limitations of the camera like e.g. reduced saturation, but also to improve the artistic look of colors to his liking with e.g. appropriately dark corridors, and this master grading can be quite complex and carefully made)

In FIG. 1, several exemplary curves of a proposed log curve family have been plotted, starting at a=32 and increasing to a=2048 in steps of ⅓ stop ($2^{1/3}$), where this step size can easily be observed at the middle position (value 0.5) of the log scale.

So now we have a set of functions controllable by one parameter a. The grader may easily derive the optimal a-value for e.g. a shot/run of pictures by e g tuning a knob, and an automatic image analysis algorithm may similarly choose an optimal a-value. And we may also easily encode this relationship in an image or video signal encoding S_im, by defining a data type being e.g. a float or int (since we don't need many values, we can encode our a-values as e.g. A*a+B so that different a-values are allocated to e.g. 8-bit code word values) for storing the grader-selected a-value. So as an alternative to encoding the full curve in the signal like e.g. a LUT, embodiments of our technology may (once or a couple of times, with the same value for security against data corruption, or different a-values for adaptivity) just encode the a-value, and then if the used functions are not pre-agreed at run-time but in a standard, the receiving end will immediately know which actual function is associated with the a-value. At a receiving end this value may then be used for mapping the received image Im_1DR to a final image to be rendered on a particular tv.

An even better way to propose a family of log-gamma curves is:

$$L = L_m \left(\frac{\rho^v - 1}{\rho - 1}\right)^\gamma$$

where L is the luminance in cd/m², v is the electrical value normalized to the 0 . . . 1 range, and $L_m$ is the peak luminance value of the display in cd/m². The proposed values of the optimal constants ρ and γ in case one may define only a single master HDR code allocation curve are ρ=25 and γ=2.4.

We can correspond with that EOTF inverse OETF functions, which at least over the range approximate this behaviour to a high degree of accuracy (but one may slightly deviate to conform them more to how classically OETFs have been defined, e.g. making a lower luminance part linear), eg.:

$$E' = \begin{cases} \log(4.5E \cdot (\rho - 1) + 1)/\log(\rho), & 0 \le E < \beta \\ \log((\alpha E^{0.45} - (\alpha - 1)) \cdot (\rho - 1) + 1)/\log(\rho), & \beta \le E \le 1 \end{cases}$$

where E is a voltage normalized by the reference white level and proportional to the implicit light intensity that would be detected with a reference camera colour channel R, G, B, i.e. one may suppose these are linear voltages resulting from filling the R, G and B pixel bins with photo-electrons, and E' is the resulting non-linear signal, i.e. the luma code. And:
ρ=25, α=1.099 and β=0.018 for 10-bit system
ρ=25, α=1.0993 and β=0.0181 for 12-bit system
If comparing to the first variant we can identify rho with a as:

$$\rho = \left(\frac{a}{8\sqrt{2}} - 1\right)^2$$

Some further rationale for deriving above particular optimal luma allocation functions OETF:

Current television systems have an end-to-end (optical to optical) non-linear transfer characteristic. This transfer characteristic provides the correct rendering intent for the typical dim surround television viewing environment; see e.g. sections 11.9, 19.13, and 23.14, of "The Reproduction of Colour" by R. W. G. Hunt (Sixth ed., Wiley, 2006).

Philips has investigated the end-to-end television system transfer characteristic for future high dynamic range television systems with high peak luminance displays (specifically a display with a peak luminance of 5 000 cd/m² was applied in Philips' experiments) and has found that the current end-to-end transfer characteristic is also applicable to these future systems. The explanation for this observation is that the transfer characteristic is determined by the television viewing environment, which for high dynamic range television will be the same as it is for current television.

The end-to-end transfer characteristic for current television systems is determined by the concatenation of the recommended OETF (Rec. ITU-R BT.709 and Rec. ITU-R BT.2020) and EOTF (Rec.ITU-R BT.1886).

For example, the Rec. ITU-R BT.709 OETF is given by:

$$V = 1.099\, L^{0.45} - 0.099 \text{ for } 1 \geq L \geq 0.018$$

$$V = 4.500\, L \text{ for } 0.018 > L \geq 0$$

Combining this OETF with the gamma 2.4 EOTF of Rec. ITU-R BT.1886 results in the end-to-end transfer characteristic:

$$(1.099\, L^{0.45} - 0.099)^{2.4} \text{ for } 1 \geq L \geq 0.018$$

$$(4.500\, L)^{2.4} \text{ for } 0.018 > L \geq 0$$

Philips proposes to fully preserve the end-to-end transfer characteristic for high dynamic range television systems using the proposed EOTF. This EOTF has the normalized form $$x = \left(\frac{\rho^v - 1}{\rho - 1}\right)^y$$

It can be seen to be a concatenation of the function $$x = \left(\frac{\rho^v - 1}{\rho - 1}\right)$$

and the gamma 2.4 EOTF according to Rec. ITU-R BT.1886. Hence, to preserve the end-to-end characteristic, the OETF used with the proposed EOTF should be the concatenation of the currently recommended OETF (Rec. ITU-R BT.709 and Rec. ITU-R BT.2020) and the inverse function of $$x = \left(\frac{\rho^v - 1}{\rho - 1}\right),$$

which is:

$$v = \frac{\log(x \cdot (\rho - 1) + 1)}{\log(\rho)}$$

This concatenation results in the following OETF (taking the Rec. ITU-R BT.709 OETF as an example):

$$V = \frac{\log((1.099 L^{0.45} - 0.099) \cdot (\rho - 1) + 1)}{\log(\rho)} \quad \text{for } 1 \geq L \geq 0.018$$

$$V = \frac{\log(4.500\, L \cdot (\rho - 1) + 1)}{\log(\rho)} \quad \text{for } 0.018 > L \geq 0$$

Filling in the proposed value of 25 for p, the OETF can be further simplified to:

$$V = \frac{\log(26.376 L^{0.45} - 1.376)}{\log(25)} \quad \text{for } 1 \geq L \geq 0.018$$

$$V = \frac{\log(108 L + 1)}{\log(25)} \quad \text{for } 0.018 > L \geq 0$$

Equivalently, for Rec. ITU-R 2020 the proposed OETF is:

$$E' = \begin{cases} \log(4.5 E \cdot (\rho - 1) + 1)/\log(\rho), & 0 \leq E < \beta \\ \log((\alpha E^{0.45} - (\alpha - 1)) \cdot (\rho - 1) + 1)/\log(\rho), & \beta \leq E \leq 1 \end{cases}$$

where E is voltage normalized by the reference white level and proportional to the implicit light intensity that would be detected with a reference camera colour channel R, G, B; E' is the resulting non-linear signal. Where:
ρ=25, α=1.099 and β=0.018 for 10-bit system
ρ=25, α=1.0993 and β=0.0181 for 12-bit system The simplest way is to just apply the mapping to derive the complementary image (e.g. if the HDR_ORIG was encoded with N-bit color coordinates on the disk, the LDR_cont image for driving any tv with a substantially lower peak brightness may be used by merely applying our chosen loggamma function with the co-encoded a-value), but one may also derive intermediate gradings for final rendering as e.g. taught in WO2012/127401.

Our invention may be used in several ways in several embodiments. E.g. if the grader doesn't care choosing an optimal curve for the particular image/video at hand, a default curve is selected with e.g. a=1100 (and if the a-value data type in the signal has no value filled in, the receiving end will by default use this value. But otherwise the grader may find that e.g. an a=550 curve would give better results, and then write this value in at least one copy of the a-value data type on the disk. If there are more copies there will typically be also further specification data, like reference data indicating to which part of a set of images this curve belongs, like e.g. an associated presentation time stamp, etc.

Our methods can be used whatever the format is of the image (Im_1DR) texture encoding, but e.g. it may work well with 10 bit luma encodings, and even 8 bit luma encodings, as classically used (some applications of image encoding need less quality).

Typically the chosen a-value defining the shape of the curve will be dependent on the characteristics of the envisaged rendering display, and typically its peak brightness. E.g. the grader may consider that during the best part of the lifetime of his movie, it will typically be seen on HDR displays with peak brightness of around 2000 nit. He may then use a curve which may give an optimal look on such displays (i.e. when the HDR is reconstructed), and possibly also a reasonable look on lower peak brightness displays, like a 600 nit television. Of course if 20 years from now the majority of the viewers will watch this HDR-coded movie on e.g. 15000 nit displays, although still a reasonable rendering may occur, it may not be optimal with that curve. The content creator may then make a new encoding with a different curve with a different a-value for those displays. What is also possible is to not make a new LDR image LDR_CONT for it, but already only make a new curve FL2H for reconstructing the HDR image most appropriate for the around 15000 nit category of displays.

The grader or automatic algorithm can also decide to take a particular luma code allocation curve from the family based on the characteristics of the HDR image to be encoded based on characteristics of the image to be encoded (i.e. the kind of captured scene). If it e.g. contains only dark regions (or perhaps only a small bright lamp), on could consider using a curve which sacrifices some quantization precision on the bright end, for a precision increase for the darker colors. This can be done by various image analysis algorithms starting from the simplest ones like determining the median of the luminances in the image and deciding therefrom which a-value corresponds with it, to checking ranges of available (and beyond that no or few pixels) luminances, and determining curves depending on the the size and/or location of the range of present object luminances (and e.g. looking at a gradient measure of the curve over that range, which can be used in case an allocation is done by an algorithm, but typically such knowledge will be allocated by defining human knowledge in a set of rules: e.g. the designer has made three categories: one for images which have all luminances below 50 nit, one for "outdoors" images where all luminances are above 500 nit, and an intermediate category, and when the deciding algorithms finds then an available range of e.g. 30-200 nit in the master grading, it may based on an overlap criterion select the middle range code allocation curve)

Figure 4:
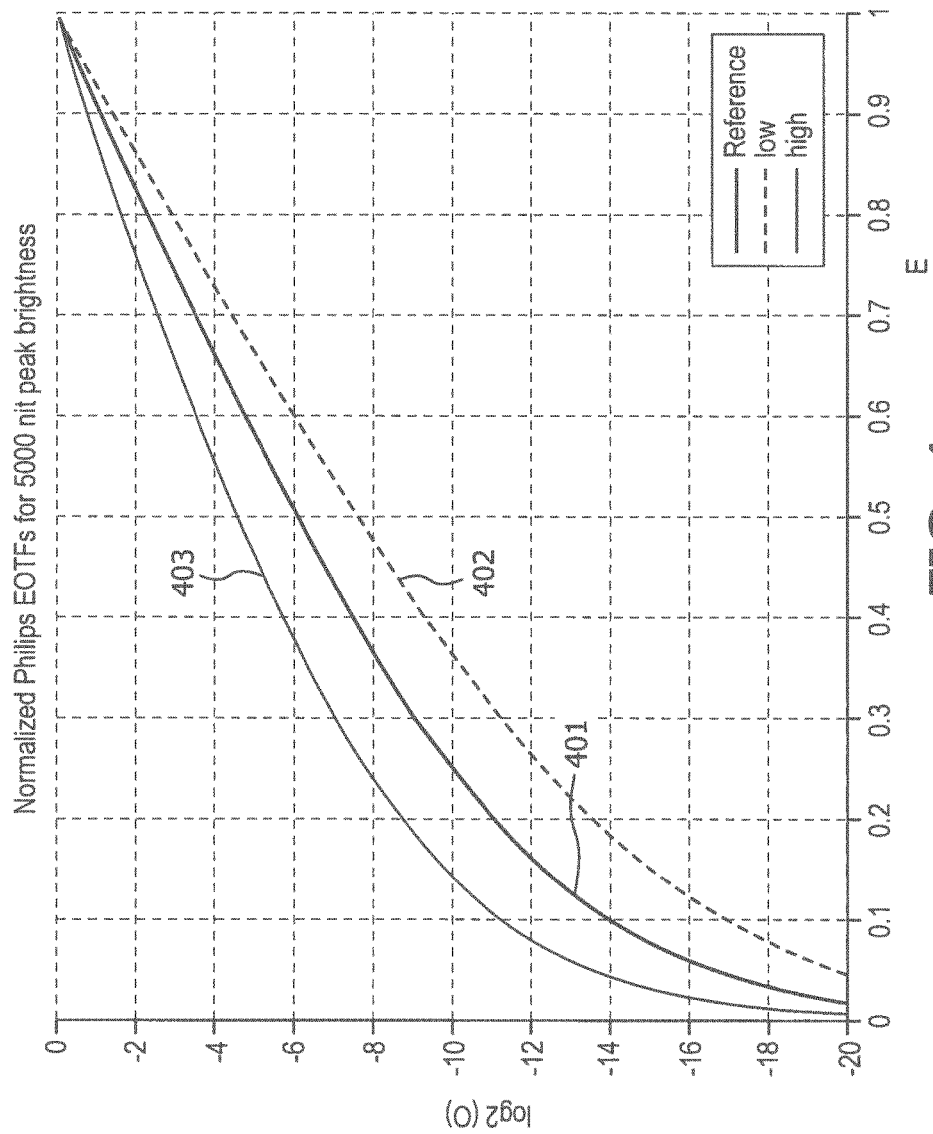
FIG. 4 schematically shows how one can select a number (3 often being sufficient) of different code allocation functions from the set dependent on the luminance characteristics of the image.

FIG. 4 gives an example of such an embodiment. The luma allocation curve is now a combination of a logarithmic and power function, with gamma preferably unequal to 1.0:

$$x = \left( \frac{10^{\frac{v-d}{c}} - b}{a} \right)^{\gamma}$$

Note that the luma codes (E horizontal axis) have been scaled to [0,1] and the corresponding luminances on a corresponding reference display are given logarithmically in stops (y-axis). E.g., if one wants a single curve for a peak luminance of 5000 cd/m2, one may use a=48*√2 and derive therefrom e.g. values of a=67.8823, b=2.8284, c=0.7153, d=−0.3230 and the gamma coefficient γ=2.35 (for different gamma values the a . . . d coefficients will typically be different).

We assume in this example that we can encode HDR images with a reference luma allocation curve 401, which will work well on all possible HDR images, like e.g. a darker indoors with simultaneously in the same image a sunny outdoors. If now however we have a program or scene which plays in a dark basement with only a couple of bright lamps (which need only be rendered bright and not perse accurate), we may want to opt for another slightly different curve, which behaves with better precision for such dark areas, i.e. has more available codes in the dark subrange of the HDR luminances/x-axis. Curve 403 would be suitable in such a case. The other scenario may also occur where there are many bright sunny outdoor pixels, and may be a couple of darker pixels which because human vision has adapted to the big bright image may not need to be quantized with absolute precision. Such a scenario may occur e.g. when one films outdoors in Thailand and can see through a little portal a little bit inside a temple (note that the rendering TV might decide to brighten up these dark interiors a little, so we would like them encoded reasonably nonetheless). In that case the human grader or encoding apparatus/algorithm may decide curve 402 is a better curve to use for LDR_CONT encoding those HDR image(s).

Figure 6:
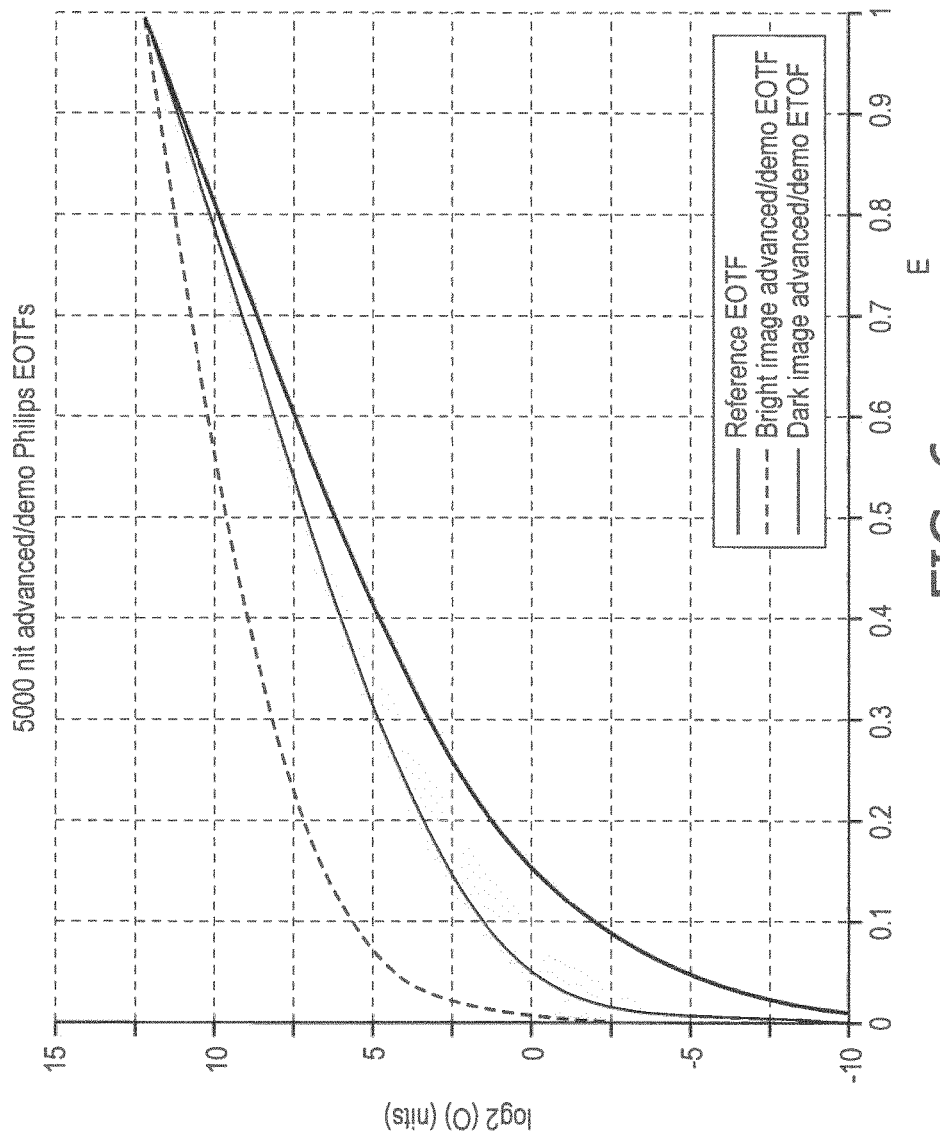
FIG. 6 schematically shows some further illustrative embodiments of how our function can already incorporate specific requirements of particular rendering systems, such as a typical average room surround illuminance.
Figure 7:
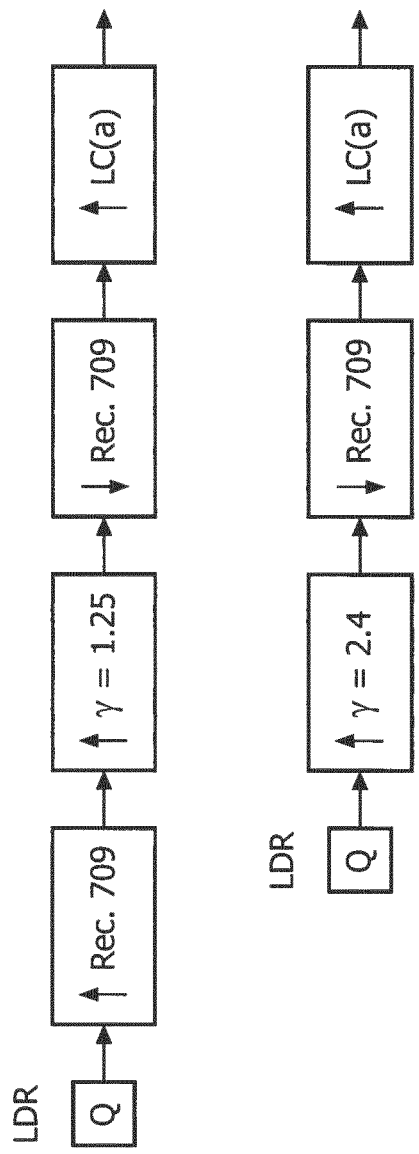
FIG. 7 schematically shows some exemplary mathematical definitions for such functions.

FIG. 6 shows the same total loggamma EOTF rationale but now when including an intended viewing environment, and FIG. 7 shows two examples defining how to calculate those functions. The part where it say "LDR" are the quantized [0,1] luma (v) code values, i.e. for an HDR only reconstruction we would typically just apply our bipartal exponential function as in claim 1 (i.e. the rho part and then the gamma part). The "gamma 2.4-part" is now changed into a pre-gamma mapping chain, but including now also a factor taking dim surround luminance into account, and the bottom part of FIG. 7 is an equivalent summarization of the upper gamma sub-mappings, into a 2.4 and rec. 709 OETF:

$v=4.5L$ if $L<0.018$ and otherwise $v=1.099L^{0.45}-0.099$ (downmapping or luma determination from luminances). LC(a) is our first part of the mapping, i.e. the rho-division without the 2.4 gamma. The arrows show an upgrading type transformation with an upwards arrow, i.e. a transformation which e.g. typically stretches the bright objects away from the darker ones and the middle grey, and vide versa. Q is say a normal 10 bit quantized LDR image according to rec. 709. The second Rec. 709 downgrading reformats (redistributes correctly along the luma axis) the correctly determined input, as according to what our master EOTF of claim 1 expects as input. The result of the upper or lower chain of FIG. 7 would then typically be sent to a reference monitor, i.e. an actual display specified according to a gamma of 2.4.

Figure 8:
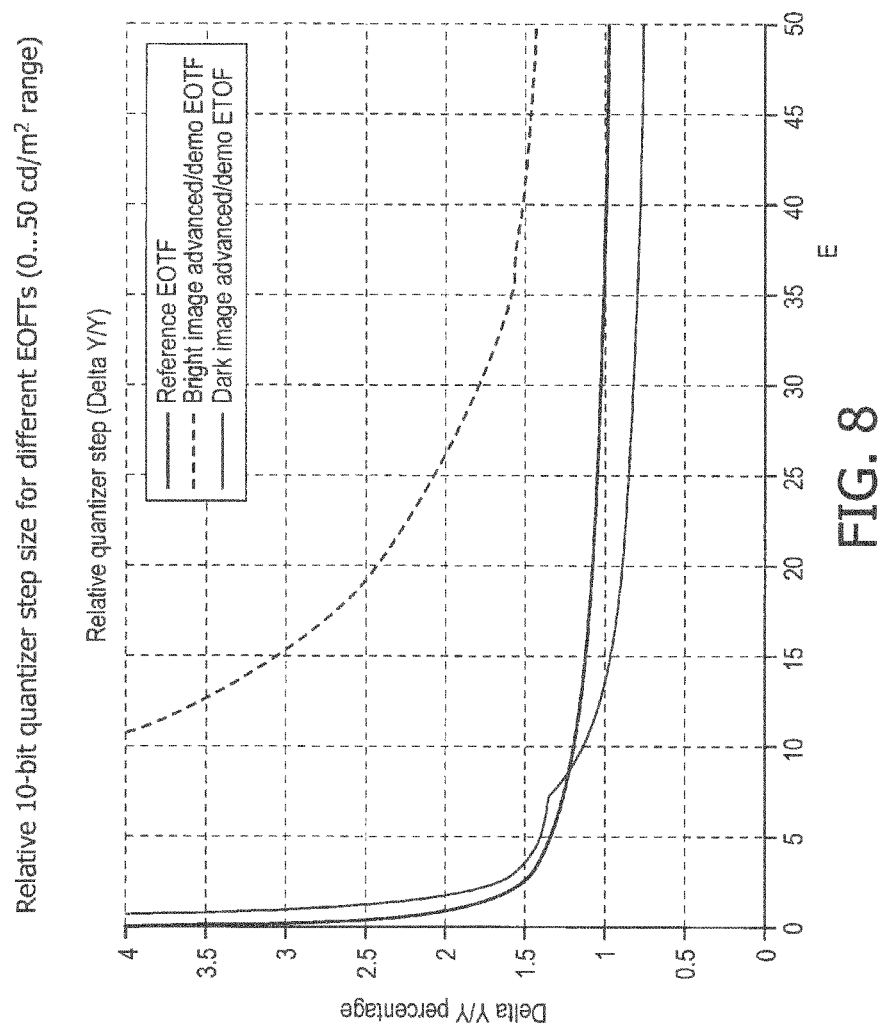
FIG. 8 schematically shows some equivalently for the chosen curves of FIG. 6 the steps DY/Y of the rendered luminances which occur along the code range when a code step is made, which relates to just noticeable differences (JND) of color quantization errors, in this example when a typical value of 10 bits for the luma value is used.

FIG. 8 shows a zoom-in on the dark object colors, when the FIG. 6 functions are converted to DY'/Y'.

Figure 3:
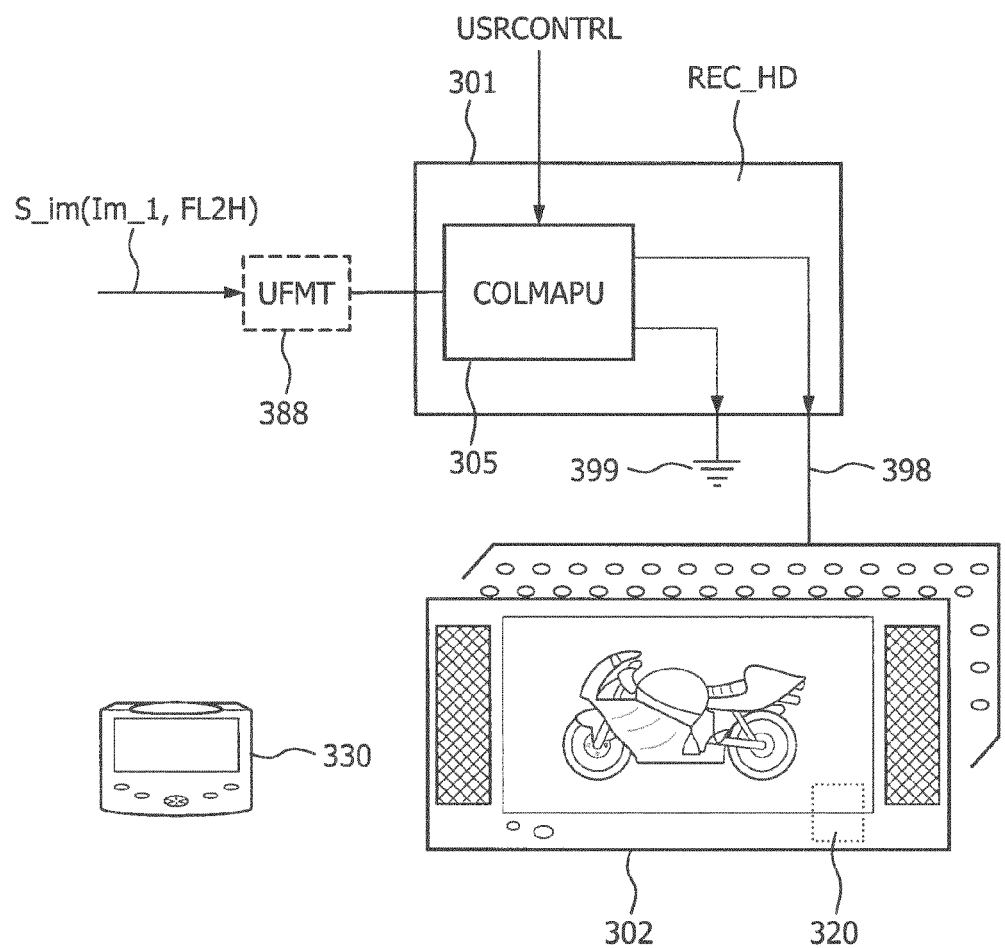
FIG. 3 schematically shows some possible apparatuses for using image(s) encoded according to this invention.

FIG. 3 shows an example of a possible receiving side system at a consumer's home or professional location, like e.g. a digital cinema. There are many applications and types of apparatus which can use our decoding technology, and can comprise a decoding unit like e.g. a piece of an IC, yet we elucidate only one of it, as the skilled person can understand having our teachings how to map it to other scenarios. An unformatter 388 unpacks and decodes the signal S_im from whatever format it was recorded/transmitted and received in. We assume in this non-limitative example that the reception and initial processing is done by some image handling apparatus 301 (which could be a settopbox, blu-ray player, personal computer, etc.), which transmits a correctly created—as the specifics of display and possibly environment would desire it—final image to be rendered to a display 302 (in this example the display having no further color optimizing capabilities, but just some hardware-determined colorimetric characteristics). But of course if this display is smarter and e.g. a television, it may itself perform most or all of the described actions in image handling apparatus 301. We will assume for simple explanation that the display is an HDR display (e.g. with 5000 nit peak brightness), and gets the image to be rendered over image communication technology 398, e.g. an HDMI cable, etc. The less smart the displays are, the more the image over the cable will look like a standard image like fully optimized in XYZ, or even a direct driving RGB image, yet the more smart the display is, the more parametric it may get the image, such as e.g. whatever the LDR_CONT encoded image, and the parameters for deriving the desired optimal driving image by the display itself. The display (and S_im metadata) could be embodied to apply different color mapping strategies for different shots in a movie. The image signal S_im may come in via various transmission technologies, e.g. on a physical carrier memory like a BD disk, or via a network-connected video store subscription wired or wireless, etc.

In some embodiments, image handling apparatus 301 will also or even solely generate an LDR for a second, LDR display 330 (which image may e.g. be directly the LDR_CONT image or a mere colorimetric transformation thereof to RGB without dynamic range or viewing environment adjustments, but it may also be a second optimally grader image derived from the encoded image LDR_CONT), which is streamed e.g. over a wireless image/video/data connection via antenna 399, but the core of our invention may also be used to create only an HDR image.

A color mapping unit 305 takes e.g. a LDR_CONT encoded image from S_im and converts this to Rec_HDR, by reading the FL2H mapping function from the signal, or reading a FH2L mapping function, and converting it internally to its inverse FL2H mapping function.

It should be understood that many such apparatuses or systems can be built from our invention, and it can reside in professional or consumer cameras, any kind of display (e.g. may reside in a portable device like a mobile phone), color grading software, transcoders such as e.g. video improvement devices, video management systems, publicity displays in e.g. supermarkets, etc.

Until now we have only discussed about what to do on the luminance axis of color space, but colors need a 3-dimensional definition. What we have done in the luma Y direction is stretching and squeezing the color coordinates via the color allocation function, so that everywhere equal steps are visually approximately equally important. This means if we then quantize, we have approximately an equal number of codes for each luminance region which looks similarly contrasty, i.e. we reduce the banding everywhere to approximately the same degree. But color space is highly non-linear, and typical color spaces like XYZ or xyY are not well-mapped to the natural metric of human vision. We hence need to do a similar trick in the color direction.

Figure 5:
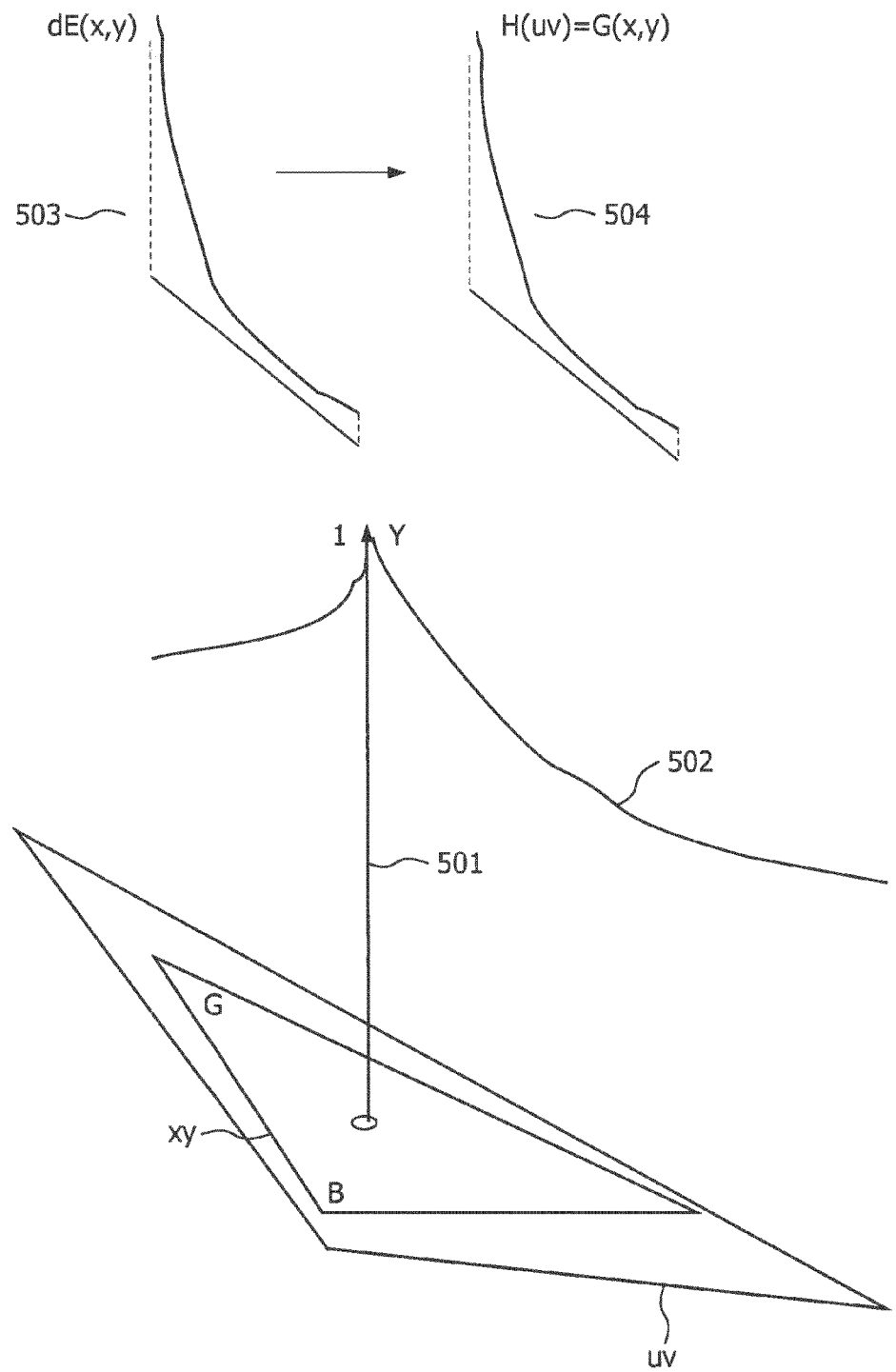
FIG. 5 schematically shows how one can define a chromatic component encoding belonging to any of our possible luma encodings.

The inventor already realized before (see yet unpublished application EP12187572) that one may decompose the encoding space into a Y direction and a chromatic direction of color planes (in any case this space is not necessarily used to do e.g. image color processing in, but may only be used as an intermediate "value-holder" and whatever the color coordinates, it may be sufficient if only we can retrieve the original e.g. XYZ_16 bit of the master HDR via reverse mapping). We see this schematically in FIG. 5. The gamut 502 of all encodable RGB colors (and we may like to use a space like xyY, so that all possible physically occurring colors up to a maximum luminance defined by the definition of the white point of the top of the gamut, e.g. 5000 nit are encodable) is determined by the color triangle xy, and the luma Y-axis 501. And more specifically, which lumas Y or corresponding luminances L this Y-axis defines by its used code allocation function. One may conceptually see the use of a different code allocation function as harmonica-stretching all colors in the gamut according to the code allocation function. E.g., if we consider the precision around the middle (Y=0.5) to be insufficient, we may chose another log function which stretches the values there, and compresses in the other subranges of the Y-axis. If one then quantizes e.g. each $\frac{1}{100}^{th}$ value, this stretched region of luminances between say 500 and 800 nit may then stretch over 6 luma codes instead of e.g. 4. The same will happen for other chromaticities, e.g. EP12187572 defines an embodiment of how to do this by following the chosen logarithmic functional shape but now not over the [0,1] Y-span, but over the span of possible Y's in the gamut for that particular chromaticity (x,y). We want to do the same trick now in the chromatic direction. It is known that, however desirable, the universal xy-chromaticity has rather small MacAdam ellipses in the blue region (B), and large ones in the green region (G). That means making a large coding mistake (changing (x,y)_1 into (x,y)_2 in the green region will not have such a large noticeable effect), but quantization in the blue area is more readily noticed. To be able to encode everywhere with small errors, we want to make sure that our ultimately quantized encoding distributes the quantization errors more evenly. We can determine this by an error function over the triangle (shown schematically in one dimension over a color path in graph 503), and we can change this by changing our chromaticity allocation function (schematically shown in 504 that the path H defined as a function of new coordinates uv is definable also as a function G of x and y), i.e. if an ellipse is too long for a region of color space, we can stretch color space in that region similarly, which is the inverse equivalent of compressing the ellipse. This redefinition may be a highly non-linear function, but preferably we define our coding with a simple one. Namely, one can deform the ellipses with a perspective transform:

$$u = \frac{ax + by + c}{dx + ey + f}$$

$$v = \frac{gx + hy + i}{jx + ky + l}$$

In these equations x,y and u,v are color triangles, and a . . . l are constants.

One can mathematically prove this corresponds to a basis transformation in 3D between from color space defined by the XYZ vectors to color space as defined by UVW vectors, which can be defined by a linear transformation matrix.

We found it useful to define the chromaticities with a from prior art known mapping (but never researched to be used for HDR encoding) which has reasonable uniformity:

$$u = \frac{4X}{X + 15Y + 3Z}$$

$$v = \frac{9Y}{X + 15Y + 3Z}$$

Here the chromaticity plane coordinates are directly determined from the linear XYZ color space coordinates, so we can grade in that space and then directly proceed towards color encoding.

So what we do next is we use any of the above logarithmic luma code allocation functions, and use it as the definition of Y (non-linear luma) of the Yuv color definition, and use the above definition for the chromatic component of the colors. That is how one can now define HDR colors as opposed to the classical LDR color encoding schemes.

But since all those colors have values in MATHEMATICAL range of what one would normally expect for (e.g. 10 bit for Y' as well as u and v) LDR images (in particular the not to be confused with Y'uv PAL-type YUV or YCrCb as used e.g. in MPEG2), one may do the further image encoding chain (quantizing, DCT-ing etc.) with normal LDR encoding technology. Upon reverse mapping at the receiving side we re-obtain a real HDR image which couldn't otherwise be encoded with legacy technology though.

Of course following similar technical principles, similar color spaces could be designed in which the gamut tent is defined by our new definition of the luma axis, as long as one standardly defines them so that the image(s) receiving end can recover the original master HDR.

Figure 9:
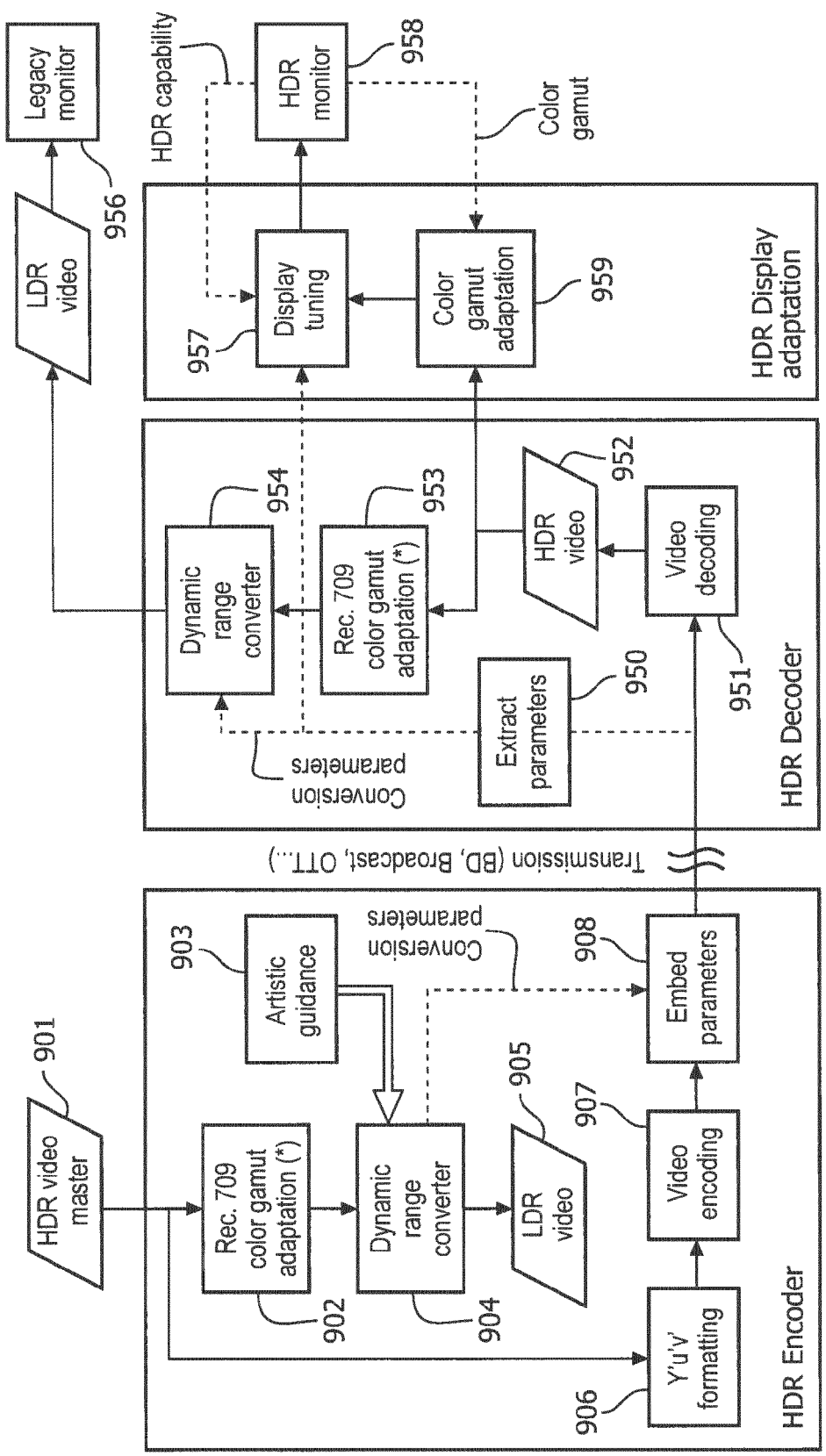
FIG. 9 schematically shows a possible coding system with encoder and decoder in case our embodiments are used in such a manner that the pixelized image in S_im is a HDR image, or more precisely when directly used has a mostly HDR-like look.

FIG. 9 schematically shows a first possible useful encoding system, in which a HDR look is dominant, i.e. we will transfer a LDR_CONT image which is still of relatively large dynamic range (i.e. when directly shown on a LDR display, it may e.g. have dark regions which are too dark to be sufficiently recognizable, yet a perfect HDR image can be obtained at the receiver side for HDR display on e.g. a 5000 nit HDR monitor 958 if connected). Our EOTF is particularly suited for this scenario, and then e.g. parameters rho=25 and gamma=2.4 may be embedded in the image signal S_im by parameter embedding unit 908.

We start from our master HDR grading HDR_ORIG (here ref nr. 901, not a hardware unit, but an image). Color conversion unit 902 can do a color transformation, e.g. if the original resides with saturated chromaticities in a relatively wide color gamut (as may happen e.g. with some colorants in movie material), and e.g. only a serving of consumer displays of typical Rec. 709 primaries is envisaged, this color conversion unit 902 may already do a pre color gamut mapping to the Rec. 709 gamut. A dynamic range convertor 904 applies some functions, typically under artistic guidance from a grader via interface unit 903, to obtain an LDR look image 905. This LDR image may be obtained via relatively simple reversible color mapping, but it may also be obtained by more complex and irreversible (data destroying, i.e. from that image alone the master HDR cannot be perfectly reconstructed) mappings. The HDR is now mapped according to our embodiments, i.e. using the inverse of the EOTF of claim 1, into our Y'u'v' encoding by color encoder 906. Then regular video encoding is done by video encoder 907, which may e.g. be a HEVC encoder, or anything similar. Finally in this exemplary embodiments the parameters of our colorimetric encoding functions (at least one of rho, gamma and Lm) are embedded as metadata in S_im to be transmitted e.g. as a DVB or ATSC formatted HDR television signal. At a receiver side, a receiver will do regular video decoding with decoder 951, which decoder is however also augmented with our technology, to obtain a Rec_HDR image 952, e.g. in XYZ. After a second gamut adaptation by second color mapper 959, we can take into account that the connected monitor has e.g. wide gamut capabilities. Display tuning unit 957 can do further display tunings, like e.g. apply our second color mapping functions to derive an optimal look luminance-wise for the connected display being e.g. a 2400 nit display, and also viewing environment particulars, or even viewer desires (preferred brightness of the viewer) can be handled. The various parameters in S_im are extracted by parameter extractor 950, and some of those will be usable for deriving a good LDR look. So in this system embodiment, the LDR will be derived from the HDR (not exactly the original HDR, but the very close approximation at the receiver side Rec_HDR), by first e.g. doing a further color mapping by color mapping unit 953, and then doing the dynamic range conversion by luminance mapper 954, yielding an LDR video for any connectable LDR monitor 956. Of course this reconstruction of the LDR look from the recovered Rec_HDR mimics how the LDR was generated on the transmitter side, via the parameters. In fact, some embodiments may be used when one considers a mapping with our OETF being the inverse EOTF according to our main claim is already enough, of course then with optimized rho and gamma parameters for the particular shot or scene, but in general there may be further functions involved and stored in S_im, e.g. a contrast stretching of a main LDR range in the HDR image, and a hard clipping outside that range, etc.

Figure 10:
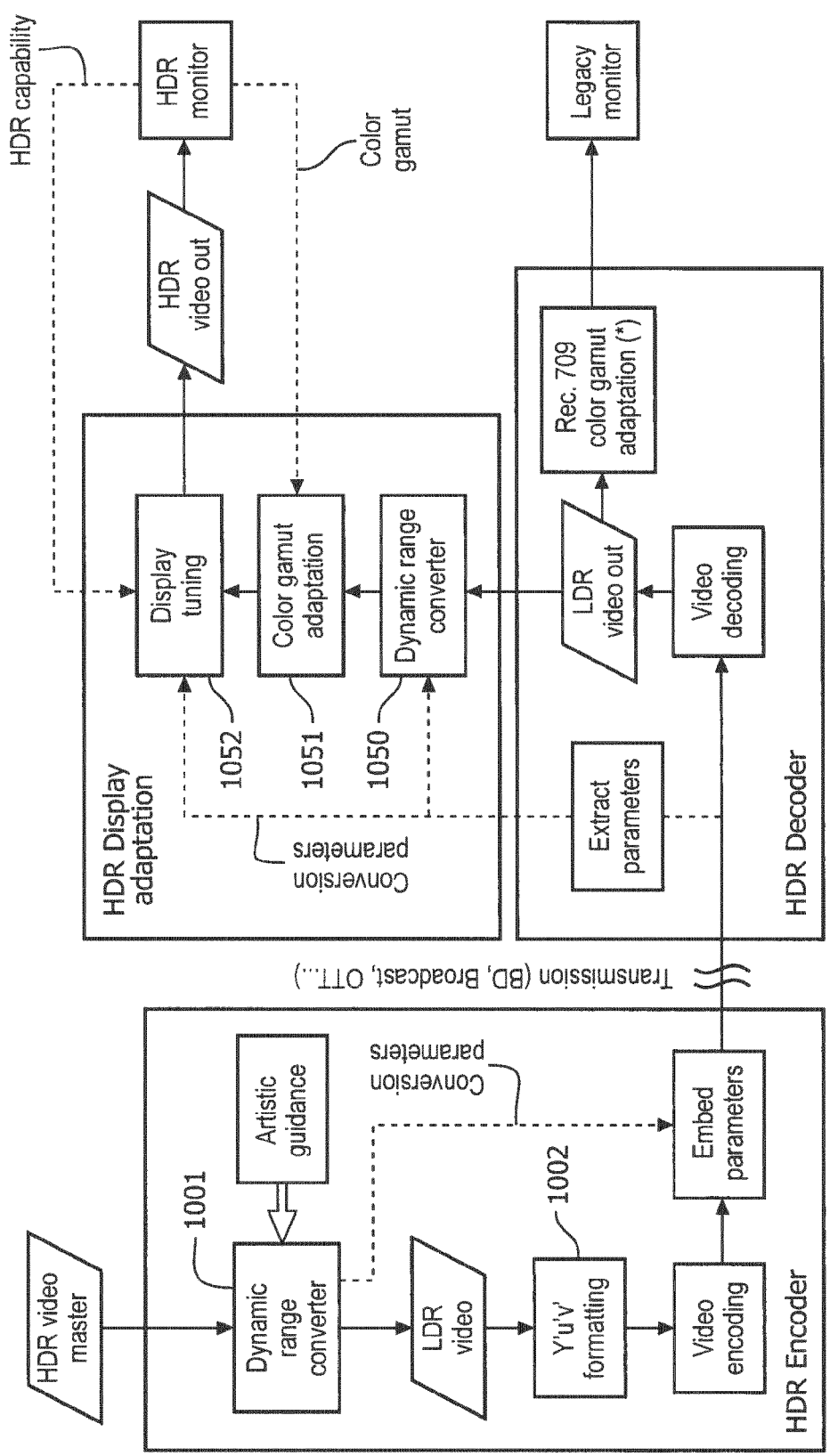
FIG. 10 schematically shows a possible coding system in case our embodiments are used in such a manner that the pixelized image in S_im has a more LDR-like look, or more precisely mostly LDR-like look, suitable for substantially direct rendering on LDR displays of around 100 nit peak brightness, e.g. 500 nit peak brightness, and FIG. 11 schematically shows just one possible encoding in an image signal of an HDR image, and a corresponding LDR image parametrically derivable from the HDR image.

FIG. 10 shows a particular example of a system built according to another philosophy of which kind of LDR_CONT/Im_1 image should actually be encoded, but still following our EOTF technology.

The components on the transmitter side like dynamic range converter 1001 and Y'u'v' color converter 1002 are similar to those in FIG. 9. However, now we will use an Im_1 with an LDR look on disk. So the loggamma function applied in 1001 to obtain the LDR video may have a higher equivalent gamma (the equivalent gamma of our standard rho, gamma parameters, i.e. when just using a plane gamma function L=v^gamma is about 7) than in the HDR look in S_im scenario of FIG. 9, by using different parameters rho and gamma, but for other scenes they may also be lower. In any case we would now typically use only reversible luminance mapping functions, and our EOTF and its inverse OETF fulfill this criterion. The LDR image (although typically still being Y'u'v' instead of YCrCb) goes in a regular video encoder again. Now however on the receiving side the embedded parameters are not used to create an LDR look, but to create a HDR look, and the LDR image may be directly sent to a LDR monitor. So to obtain HDR the LDR from S_im is successively processed by a dynamic range upconverter 1050, a color converter 1051 for getting the desired chromatic look, and a display tuning unit 1052 for getting the right look for a particular display starting from a reconstructed HDR in a reference range like [0-5000]. The skilled reader should understand that further practical embodiments starting from our present teachings may e.g. use an OETF and EOTF which mostly has the loggamma shape (i.e. e.g. it typically has such output values as defined by a function from our rho, gamma family of curves for most input values over the range of possible input values [0,1]), yet for some input values the mapping may be somewhat different, e.g. locally implementing a different slope and gradually smoothing that until the standard loggamma parts of the EOTF are reached. Such a deviation may be done in an encoder apparatus by an automatic image analysis algorithm, or a grader explicitly specifying a local change in the curve, or any semi-automatic manner which gets some guidance of the grader and then does some calculations to arrive at the partial modification. These curves may then e.g. be communicated as LUTs, although they could also be communicated parametrically, e.g. with a local modification shape, functionally encoded with one or more additional parameters (e.g. a Gaussian bump modification etc.).

FIG. 11 shows an example of how one can encode a HDR image signal 1100 taking into account the teachings of the present application. We assume that we encode a set of dynamic range looks on a HDR scene, for which we need to be able at the receiver side at least a master high dynamic range image with potentially objects of to be rendered luminances all across a reference luminance range of say 0.005-5000 nit. At the same time we want to be able to redetermine at decoding side at least a low dynamic range image of the same scene, which is to be determined on the basis of the encoded HDR image 1101 and mapping functions. As said the encoding/decoding blocks will be standard like the functionalities in e.g. HEVC, so we will focus on the new colorimetric teachings to make HDR encoding possible in this framework.

So the image pixel luma matrix of image 1101 will be determined by a "loggamma" function of our main teaching, which defines how the luma codes relate to luminances in the e.g. 0.005-5000 nit reference luminance range. I.e. image 1101 encodes a HDR image. Whatever the luma codes are exactly (however they're defined), they can be transformed during decoding into pixel luminances (or actually together with the chromatic components which typically are (uv,)

pixel colors in e.g. linear or gamma-domain RGB) renderable on a reference 5000 nit peak brightness display. A display with other characteristics will then still do a display-dependent optimizing color transformation, typically based on the image and metadata color mapping functions in our signal 1100. In case a pre-agreed EOTF for defining the luma codes is used (with fixed Lm, rho and gamma), one need not perse encode information on it in the image signal 1100, because the decoder knows what function to use. Or if one out of a few fixed functions are selectable, a correspond curve number 1108 may be encoded (e.g. pre-agreed curve 3). That data placeholder in the signal is complementary to more exactly specifying the EOTF, and need in the latter scenario not be filled in. In such a case one may (typically e.g. per scene after a scene change, i.e. valid between two picture numbers or time moments) partially or fully define the lumas in image 1101 by filling in a rho value 1102, multiplier Lm 1109 and/or gamma value 1103. In some scenarios another gain factor 1104 may be used. Although sometimes this could be encoded with Lm, there can be scenarios in which one wants to fill Lm with the standard value 5000 for the entire movie, but e.g. encode a relatively darker scene with gain factor 1104. In that case if e.g. the typical (to be rendered on the reference display) luminances in the scene fall say below 100 nit, with a couple of outliers going to 1000, one may decide to pretend as if this was a different signal up to 5000 nit. This multiplicative stretch will be done by the encoder before applying quantization and DCT-ing. The gain factor 5 or $\frac{1}{5}^{th}$ filled in place holder 1104 for metadata in the signal then still specifies how the decoder has to divide resp. multiply the decoded signal to arrive at the desired look.

For some more advanced encoding functions, a deviation of the loggamma function can also be encoded in deviation number set 1107. This may contain e.g. a specification of an additive or multiplicative deformation along a part of the loggamma function, creating in some subregions of that part a larger resp. a smaller gradient, resulting in more or less codes allocated to various object regions of the image. These numbers can also encode a functional transformation of our loggamma function, e.g. two parameters L1 and L2 demarcating a subrange of the EOTF in luminance or luma which is adjusted, and some parameters defining a transformation, e.g. $ax^2+bx+c$, wherein x is a running coordinate in the subrange, and the a,b,c constants are encoded in the various D3, D4, . . . number placeholders. The encoder will know what the function means, because there will be some preagreed coding mechanisms for the functional deformations.

Then other metadata will define how to derive an LDR look image based on the HDR image 1100 encoded in the image signal. This LDR image could e.g. be an image of lesser contrast showing all codes available in the HDR image (mapped to LDR with a further gamma function e.g.), or a contrasty LDR look which reserves many of the available LDR luma codes for an important LDR subrange of the HDR scene, and clips or soft-clips outside that region.

Typically for doing an arbitrary mapping on the lumas (keeping for now the (u,v) components the same), there will be a metadata placeholder 1105, for e.g. containing a sufficiently precise LUT encoding the shape of the luma mapping function 1110 between the lumas of the HDR image 1101 and those of the desired to be parametrically co-encoded LDR image. This function can have any shape, and needn't even be monotonous (and can of course also be defined as a luminance mapping, RGB_max mapping, or any luminance correlate mapping). Further there may be color processing, e.g. a saturation mapping, which may be done with a 1D LUT 1106 defining per luma a multiplicative saturation factor (realizing luma dependent saturation modification 1120 for the LDR image after tone mapping from the HDR image), or more complex strategies, which can e.g. allow the grader to make some objects which are less bright in LDR at least more colorful, or according to another saturation change philosophy. Simple versions of the signal may only have one saturation number position, or other signals may have an additional position in metadata for filling in a single saturation number, so that this single multiplier can be applied to all pixel colors irrespective of their luminances. This is just an example of what may typically be encoded in an HDR+LDR image signal, and there may be various such number sets, e.g. to process local segmentable regions of an image, but it should give sufficient understanding of how according to our presented techniques one can in fact not only encode an HDR image of a scene, but also co-encoded various other-dynamic-range re-looks of that scene, suitable for rendering on display systems with different dynamic range capabilities than the e.g. 5000 nit reference display.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

A computer program product version of the present embodiments as denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product. It should be clear that with computer we mean any device capable of doing the data computations, i.e. it may also be e.g. a mobile phone. Also apparatus claims may cover computer-implemented versions of the embodiments.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined

The invention claimed is:

1. An encoding method, comprising the acts of:
inputting pixel colors of an input high dynamic range video image, wherein the pixel colors have information of a luminance and a chromaticity;
applying an inverse of a mapping function, to derive a luma code (v) of the luminance of a pixel color, which mapping function is predetermined as comprising a first partial function which is defined as $$P = \left(\frac{\rho^v - 1}{\rho - 1}\right),$$

in which rho is a tuning constant, and v is the luma code corresponding to a luminance to be encoded, and a second partial mapping defined as $L=L_m P^\gamma$ in which Lm is a peak luminance of a predefined reference display, and gamma is a constant which is preferably equal to 2.4,
outputting a matrix of pixels having a color encoding comprising the luma codes.

2. The method of claim 1 in which Lm equals 5000 nit.

3. The method of claim 1 in which rho equals 25.

4. The method of claim 1 in which the gamma function is composed of an equivalent gamma of a Rec. 709 encoding gamma and a gamma 2.4 function.

5. The method of claim 1 in which the parameters rho and gamma, are further optimized to yield an encoded image which looks good according to a human color grader on a 100 nit display, whereby the at least one of the parameters rho and gamma is preferably optimized by a human grader.

6. The method of claim 1, in which chromaticity coordinates (u,v) of the color encoding are defined referenced from a CIE XYZ representation of the colors of pixels in the high dynamic range image (HDR_ORIG) by fractional equations of the type:

$$u = \frac{aX + bY + cZ}{dX + eY + fZ} \text{ and } v = \frac{gX + hY + iZ}{jX + kY + lZ},$$

with a . . . l constants, and preferably with values: a=4, b=c=0, d=1, e=15, f=3, h=9, g=i=0, j=1, k=15, l=3.

7. The method of claim 1, in which the chromaticity coordinates (u,v) are defined relative to a predetermined white point such as preferably D65.

8. The method of claim 1, in which an image signal (S_im) is formed which comprises a pixel matrix image with pixel colors encoded with one color component being the luma code, and associated therewith metadata comprising at least one of the rho and gamma parameter.

9. A video encoding apparatus, comprising:
an input for obtaining pixel colors of an input high dynamic range video image, wherein the pixel colors have information of a luminance and a chromaticity;
a grading managing unit arranged for applying an inverse of a mapping function to derive a luma code (v) of the luminance of a pixel color, which mapping function is predetermined as comprising a first partial function which is defined as $$P = \left(\frac{\rho^v - 1}{\rho - 1}\right),$$

in which rho is a tuning constant, and v is the luma code corresponding to a luminance to be encoded, and a second partial mapping defined as $L=L_m P^\gamma$ which is a gamma transform, and wherein Lm is a peak luminance of a predefined reference display, and gamma is a constant which is preferably equal to 2.4,
an encoder connected to a video transmission connection, connectable to a video memory or network, arranged to encode and transmit an image signal S_im comprising a pixel matrix image with pixel colors encoded with one color component being the luma code, and associated therewith metadata comprising at least one of the rho and gamma parameter.

10. The video encoding apparatus of claim 9 comprising a user interface unit allowing a human grader to select a particular value of rho and/or gamma.

11. The A video encoding apparatus as of claim 9 comprising an automatic image analysis unit arranged to determine a particular value of rho and/or gamma based upon a statistical analysis of the luminances of objects present in at least one of the high dynamic range images (HDR_ORIG).

12. The video encoding apparatus of claim 9 in which the grading managing unit is arranged to determine chromatic components of the pixels of the high dynamic range image (HDR_ORIG) as:

$$u = \frac{aX + bY + cZ}{dX + eY + fZ} \text{ and } v = \frac{gX + hY + iZ}{jX + kY + lZ},$$

with a . . . l constants, and preferably with values: a=4, b=c=0, d=1, e=15, f=3, h=9, g=i=0, j=1, k=15, l=3.

13. A video decoding apparatus comprising:
a receiving and formatting unit arranged to receive high dynamic range image encoding (S_im) and derive therefrom an image encoding (Im_1) comprising luma codes, resulting from an encoding method of claim 1, to be processed;
a color mapping unit arranged to apply a color mapping strategy to derive from the image encoding Im_1 a high dynamic range image (REC_HDR), wherein the color mapping unit is arranged to apply on pixel lumas v in the image encoding (Im_1) a predetermined mapping function defined as comprising a first partial function which is $$P = \left(\frac{\rho^v - 1}{\rho - 1}\right),$$

in which rho is a tuning constant, and v is the luma code corresponding to a luminance to be encoded, and a second partial mapping defined as $L=L_m P^\gamma$ in which Lm is a peak luminance of a predefined reference display, and gamma is a constant which is preferably equal to 2.4 to obtain luminances L of pixels of the high dynamic range image (REC_HDR).

14. The video decoding apparatus of claim 13 wherein: the receiving and formatting unit is arranged to derive from the high dynamic range image encoding (S_im) at least one of the parameters rho, gamma, or Lm.

15. The video decoding apparatus of claim 9, in which the color mapping unit is further arranged to receive chromaticity coordinates (u,v) for the pixel colors, and to apply a transformation to map together with the information of the luminances the u and v components of the pixel colors of the image Im_1 to a universal color representation like e.g. a CIE XYZ color representation, or to a device dependent color representation like RGB.

16. The video decoding apparatus of claim 9 in which the color mapping unit is further arranged to apply a second color mapping strategy using further color mapping parameters co-encoded as metadata specifying a color mapping to an image with a dynamic range different from the dynamic range defined by the high dynamic range image (REC_HDR).

17. A display comprising the video decoding apparatus of claim 9.

18. A method of video decoding, comprising:
receiving an encoded high dynamic range video of images (S_im) and deriving therefrom an image encoding (Im_1) to be processed, and
color mapping by applying a color mapping strategy to derive from the image encoding (Im_1) a high dynamic range image (REC_HDR), wherein the color mapping unit is arranged to apply on pixel lumas v in the image encoding (Im_1) a predetermined mapping function defined as comprising a first partial function which is $$P = \left( \frac{\rho^v - 1}{\rho - 1} \right),$$

in which rho is a tuning constant, and v is the luma code corresponding to a luminance, and a second partial mapping defined as $L = L_m P^\gamma$ which is a gamma transform, and wherein Lm is a peak luminance of a predefined reference display, and gamma is a constant which is preferably equal to 2.4 to obtain luminances L of pixels of the high dynamic range image (REC_HDR).

* * * * *